US012574721B2

(12) United States Patent (10) Patent No.: US 12,574,721 B2
Sedlacek et al. (45) Date of Patent: Mar. 10, 2026

(54) HANDLING UE PARAMETERS UPDATE DATA SET TYPES WHICH MAY BE UNSUPPORTED IN UE PARAMETERS UPDATE VIA UDM CONTROL PLANE PROCEDURE

(71) Applicant: Telefonaktiebolaget LM Ericsson (publ), Stockholm (SE)

(72) Inventors: Ivo Sedlacek, Hovorcovice (CZ); Mikael Wass, Sätila (SE); David Castellanos Zamora, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 413 days.

(21) Appl. No.: 18/020,957

(22) PCT Filed: Aug. 12, 2021

(86) PCT No.: PCT/EP2021/072448
§ 371 (c)(1),
(2) Date: Feb. 13, 2023

(87) PCT Pub. No.: WO2022/034160
PCT Pub. Date: Feb. 17, 2022

(65) Prior Publication Data
US 2023/0300607 A1 Sep. 21, 2023

Related U.S. Application Data

(60) Provisional application No. 63/065,244, filed on Aug. 13, 2020.

(51) Int. Cl.
*H04W 8/24* (2009.01)

(52) U.S. Cl.
CPC .................................. *H04W 8/245* (2013.01)

(58) Field of Classification Search
CPC ............................... H04W 8/20; H04W 8/245
See application file for complete search history.

(56) References Cited

U.S. PATENT DOCUMENTS

2013/0332515 A1* 12/2013 Jimenez ................. H04L 67/10
713/1
2017/0208455 A1* 7/2017 Au .......................... H04W 8/22
(Continued)

OTHER PUBLICATIONS

Author Unknown, "Technical Specification Group Services and System Aspects; Procedures for the 5G System (5GS); Stage 2 (Release 16)," Technical Specification 23.502, Version 16.5.0, Jul. 2020, 3GPP Organizational Partners, 594 pages.
(Continued)

*Primary Examiner* — Stephen J Clawson
(74) *Attorney, Agent, or Firm* — Withrow & Terranova, PLLC

(57) ABSTRACT

Disclosed herein is a method performed by a network node and a network node for handling User Equipment, UE, Parameters Update, UPU, data set types which may not be supported by a UE, the method comprising one or more of: receiving an indication of UPU data set types supported by a UE; determining if a given UPU data set type is supported by the UE based on the indication; if the given UPU data set type is supported by the UE, sending a UPU message to the UE with the given UPU data set type; and if the given UPU data set type is not supported by the UE, not sending the UPU message to the UE with the given UPU data set type.

9 Claims, 11 Drawing Sheets

(56) References Cited

U.S. PATENT DOCUMENTS

| | | | | |
|---|---|---|---|---|
| 2019/0182897 | A1* | 6/2019 | Jain | H04W 4/80 |
| 2019/0268835 | A1* | 8/2019 | Shan | H04W 48/16 |
| 2020/0112906 | A1* | 4/2020 | Chaponniere | H04W 40/248 |
| 2022/0338099 | A1* | 10/2022 | Zhu | H04W 60/04 |
| 2022/0345879 | A1* | 10/2022 | Park | H04W 80/10 |
| 2023/0189187 | A1* | 6/2023 | Velev | H04W 48/16 |
| | | | | 455/435.1 |
| 2024/0187968 | A1* | 6/2024 | Tiwari | H04W 8/20 |
| 2024/0236838 | A1* | 7/2024 | Zhang | H04W 8/20 |
| 2024/0334377 | A1* | 10/2024 | Xu | H04L 12/2869 |
| 2024/0381281 | A1* | 11/2024 | Atarius | H04W 8/22 |
| 2024/0388894 | A1* | 11/2024 | Baskaran | H04W 12/06 |
| 2024/0389053 | A1* | 11/2024 | Liu | H04W 28/06 |
| 2025/0112780 | A1* | 4/2025 | Baskaran | H04W 8/08 |

OTHER PUBLICATIONS

Author Unknown, "Technical Specification Group Services and System Aspects; Procedures for the 5G System (5GS); Stage 2 (Release 16)," Technical Specification 23.502, Version 16.5.1, Aug. 2020, 3GPP Organizational Partners, 594 pages.

Author Unknown, "Technical Specification Group Core Network and Terminals; Non-Access-Stratum (NAS) protocol for 5G System (5GS); Stage 3; (Release 16)," Technical Specification 24.501, Version 16.5.1, Jul. 2020, 3GPP Organizational Partners, 710 pages.

Author Unknown, "Technical Specification Group Core Network and Terminals; 5G System; Unified Data Management Services; Stage 3 (Release 16)," Technical Specification 29.503, Version 16.4.0, Jul. 2020, 3GPP Organizational Partners, 347 pages.

Author Unknown, "Technical Specification Group Core Network and Terminals; 5G System; Authentication Server Services; Stage 3 (Release 16)," Technical Specification 29.509, Version 16.4.0, Jun. 2020, 3GPP Organizational Partners, 60 pages.

Author Unknown, "Technical Specification Group Services and System Aspects; Security architecture and procedures for 5G system (Release 16)," Technical Specification 33.501, Version 16.3.0, Jul. 2020, 3GPP Organizational Partners, 248 pages.

Ericsson, "C1-20wxyz: UE parameters update transparent container with an unsupported UE parameters update data set type," Change Request, 3GPP TSG-CT WG1 Meeting #125-e, Aug. 20-28, 2020, Electronic Meeting, 7 pages.

Ericsson, "C1-20xxxx: Discussion on UE parameters update transparent container with an unsupported UE parameters update data set type," 3GPP TSG-CT WG1 Meeting #125-e, Aug. 20-28, 2020, Electronic Meeting, 3 pages.

Huawei, et al., "C1-191349: Correction to several 5GMM IEs," 3GPP TSG CT WG1 Meeting #115, Feb. 25-Mar. 1, 2019, Montreal, Canada, 4 pages.

Nokia, et al., "C1-196132: Discussion on UE parameters update during registration," 3GPP TSG-CT WG1 Meeting #120, Oct. 7-11, 2019, Portoroz, Slovenia, 6 pages.

International Search Report and Written Opinion for International Patent Application No. PCT/EP2021/072448, mailed Dec. 1, 2021, 13 pages.

* cited by examiner

HANDLING UE PARAMETERS UPDATE DATA SET TYPES WHICH MAY BE UNSUPPORTED IN UE PARAMETERS UPDATE VIA UDM CONTROL PLANE PROCEDURE

This application is a 35 U.S.C. § 371 national phase filing of International Application No. PCT/EP2021/072448, filed Aug. 12, 2021, which claims the benefit of provisional patent application Ser. No. 63/065,244, filed Aug. 13, 2020, the disclosures of which are incorporated herein by reference in their entireties.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In Third Generation Partnership Project (3GPP) Fifth Generation (5G) telecommunications systems, User Equipment (UE) parameters can be updated via a Unified Data Management (UDM) control plane procedure. In a UE Parameters Update (UPU) procedure, a Home Public Land Mobile Network (HPLMN) can provision or update a given UE with a specific set of parameters, generated and stored in the UDM, by delivering protected UDM Update Data via Non-Access Stratum (NAS) signaling. The information is signaled to an Access and Mobility Management Function (AMF) using a Nudm_SDM_Notification service operation, and the AMF forwards the information to the UE using a Network-initiated NAS transport procedure. An acknowledgement can be requested by the UDM, which is then sent using a UE-initiated NAS transport procedure from the UE to the AMF and further to the UDM using Nudm_SDM_Info service operation.

FIG. 1

FIG. 1 is a flow diagram illustrating UPU via UDM control plane procedure, which is reproduced from 3GPP Technical Specification (TS) 23.502 FIG. 4.20.2-1. The steps of this process are described below.

Step 1—From the UDM to the AMF: The UDM notifies the changes of the information related to the UE to the affected AMF by the means of invoking Nudm_SDM_Notification service operation. The Nudm_SDM_Notification service operation contains the UDM Update Data (e.g., "Routing Indicator update data", "Default Configured NSSAI update data") that needs to be delivered transparently to the UE over NAS within the Access and Mobility Subscription data. The UDM update data includes:

the updated parameters to be delivered to the UE (e.g., the updated Routing Indicator Data, the Default Configured NSSAI);

whether the UE needs to send an ack to the UDM; and whether the UE needs to re-register after updating the data.

Step 2—From the AMF to the UE: the AMF sends a Downlink (DL) NAS TRANSPORT message to the served UE. The AMF includes in the DL NAS TRANSPORT message the transparent container received from the UDM. The UE verifies based on mechanisms defined in TS 33.501 that the UDM Update Data is provided by HPLMN, and:

if the security check on the UDM Update Data is successful, as defined in TS 33.501 the UE either stores the information and uses those parameters from that point onwards, or forwards the information to the Universal Subscriber Identity Module (USIM); and if the security check on the UDM Update Data fails, the UE discards the contents of the UDM Update Data.

Step 3—From the UE to the AMF: If the UE has verified that the UDM Update Data is provided by HPLMN and the UDM has requested the UE to send an ack to the UDM, the UE sends an UL NAS TRANSPORT message to the serving AMF with a transparent container including the UE acknowledgement.

Step 4—From the AMF to the UDM: If the AMF receives an UL NAS TRANSPORT message with a transparent container carrying a UE acknowledgement from the UE, the AMF sends a Nudm_SDM_Info request message including the transparent container to the UDM.

Step 5—If the UDM has requested the UE to re-register, the UE waits until it goes back to RRC idle and initiates a Registration procedure as defined in TS 24.501.

The supported sets of information sent from UDM to UE are:

an updated Default Configured Network Slice Selection Assistance Information (NSSAI); and an updated Routing Indicator Data.

In the Network-initiated NAS transport procedure, the information is included in a Payload container Information Element (IE) in a DL NAS TRANSPORT message. As defined in 3GPP TS 24.501, such Payload container IE can contain one or more Payload container contents, of which UPU transparent container is one type of Payload container content. The UPU transparent container can contain one or more UPU data set of which the currently defined sets are:

| UE parameters update data set type | | | |
|---|---|---|---|
| Bits | | | |
| 4 | 3 | 2 | 1 |
| 0 | 0 | 0 | 1 Routing indicator update data |
| 0 | 0 | 1 | 0 Default configured NSSAI update data |

All other values are reserved

SUMMARY

There currently exist certain challenge(s). The unassigned code points of the UPU data set type field of the UPU transparent container are handled as "reserved." If a new UPU data set type is specified in Release 17 (Rel-17) and sent by a Rel-17 network to a pre-Rel-17 UE during the UPU via the UDM control plane procedure specified in TS 23.502 subclause 4.20, the pre-Rel-17 UE:

will consider the new code point of the UPU data set type field as "reserved";

will consider the entire Payload container IE containing the UPU transparent container as syntactically incorrect; and will ignore the entire Payload container IE containing the UPU transparent container.

In such case, all pieces of information provided in the UPU transparent container will be lost.

Moreover, if the UPU transparent container is included in the Payload container IE of the "multiple payloads" payload container type, all pieces of information in all other payload container entries (e.g., 5G System (5GS) Session Management (5GSM) message, Short Message Service (SMS) message, Location Services (LCS) message, . . . ) of the Payload container IE will be lost too.

Furthermore, the UE will not send any acknowledgement to the network as the acknowledgement is sent as confirmation of successful storage of all the received parameters.

Certain aspects of the present disclosure and their embodiments may provide solutions to the aforementioned or other challenges. Embodiments described herein handle User Equipment (UE) Parameters Update (UPU) data set types which may be unsupported in a UPU via Unified Data Management (UDM) control plane procedure. Some embodiments enable a mobile communications network to detect the UPU data set types supported by a UE so that the network only uses previously reserved code points when sending UPU data to a UE supporting such enhancement.

There are, proposed herein, various embodiments which address one or more of the issues disclosed herein. In some embodiments, a method is performed by a network node for handling UPU data set types which may not be supported by a UE, the method comprising one or more of: receiving an indication of UPU data set types supported by a UE; determining if a given UPU data set type is supported by the UE based on the indication; if the given UPU data set type is supported by the UE, sending a UPU message to the UE with the given UPU data set type; and if the given UPU data set type is not supported by the UE, not sending the UPU message to the UE with the given UPU data set type.

In some embodiments, the method further comprises requesting UPU data set types supported by the UE and receiving the indication of UPU data set types supported by the UE in response.

In some embodiments, requesting the UPU data set types supported by the UE comprises sending a message to another network node. In some embodiments, sending the message to the other network node comprises sending a Nudm_SDM_Notification comprising an indication for supported UPU data set types requested to an Application and Mobility Management Function (AMF). In some embodiments, the indication of UPU data set types supported by the UE is received from the AMF and comprises supported UPU data set types. In some embodiments, if the given UPU data set type is supported by the UE, sending the UPU message comprises sending a Nudm_SDM_Notification comprising the UPU with the given UPU data set type. In some embodiments, the AMF sends the indication for supported UPU data set types requested to the UE in a Downlink (DL) Non-Access Stratum (NAS) transport message. In some embodiments, the AMF: receives the indication of the UPU data set types supported from the UE in an Uplink (UL) NAS transport message; and sends the indication of the UPU data set types supported to the network node in a Nudm_SDM_Info message.

In some embodiments, sending the message to the other network node comprises sending a Nudm_SDM_Notification comprising an indication for supported UPUData type attributes requested to an AMF. In some embodiments, the indication of UPU data set types supported by the UE is received from the AMF and comprises supported UPUData type attributes. In some embodiments, if the given UPU data set type is supported by the UE, sending the UPU message comprises sending a Nudm_SDM_Notification comprising the UPU with a UPUData type attribute corresponding to the given UPU data set type. In some embodiments, the AMF sends an indication for supported UPU data set types requested corresponding to the supported UPUData type attributes requested to the UE in a DL NAS transport message. In some embodiments, the AMF: receives the indication of UPU data set types supported from the UE in a UL NAS transport message; and sends an indication for supported UPUData type attributes corresponding to the supported UPU data set types to the network node in a Nudm_SDM_Info message. In some embodiments, the method further comprises storing the UPU data set types supported by the UE associated with a Permanent Equipment Identifier (PEI) of the UE. In some embodiments, the method further comprises using the stored UPU data set types supported by the UE in a subsequent UPU procedure associated with the PEI.

In some embodiments, receiving the indication of UPU data set types supported by the UE comprises receiving the indication of UPU data set types supported by the UE during an initial registration procedure. In some embodiments, the indication of UPU data set types supported by the UE is received from an AMF. In some embodiments, the AMF receives the indication of UPU data set types supported by the UE in a Registration Request from the UE. In some embodiments, receiving the indication of UPU data set types supported by the UE comprises receiving a Nudm_UECM_Registration message from the AMF comprising the indication of UPU data set types supported by the UE. In some embodiments, receiving the indication of UPU data set types supported by the UE comprises receiving a Nudm_UECM_Registration message from the AMF comprising an indication for supported UPUData type attributes corresponding to the indication of UPU data set types supported by the UE. In some embodiments, the method further comprises storing the UPU data set types supported by the UE associated with a PEI of the UE during the initial registration procedure. In some embodiments, the method further comprises using the stored UPU data set types supported by the UE in a subsequent UPU procedure associated with the PEI.

In some embodiments, a network node for handling UPU data set types which may not be supported by a UE is provided, the network node comprising: processing circuitry configured to perform any of the steps of any of the above embodiments; and power supply circuitry configured to supply power to the network node.

In some embodiments, the network node further comprises a Unified Data Management (UDM) function.

Certain embodiments may provide one or more of the following technical advantage(s). By only sending UPU data set types supported by a given UE, embodiments avoid loss of information from the UE not accepting the UPU data.

BRIEF DESCRIPTION OF THE DRAWINGS

The accompanying drawings, which are incorporated herein and form part of the specification, illustrate various embodiments.

5

Figure 2:
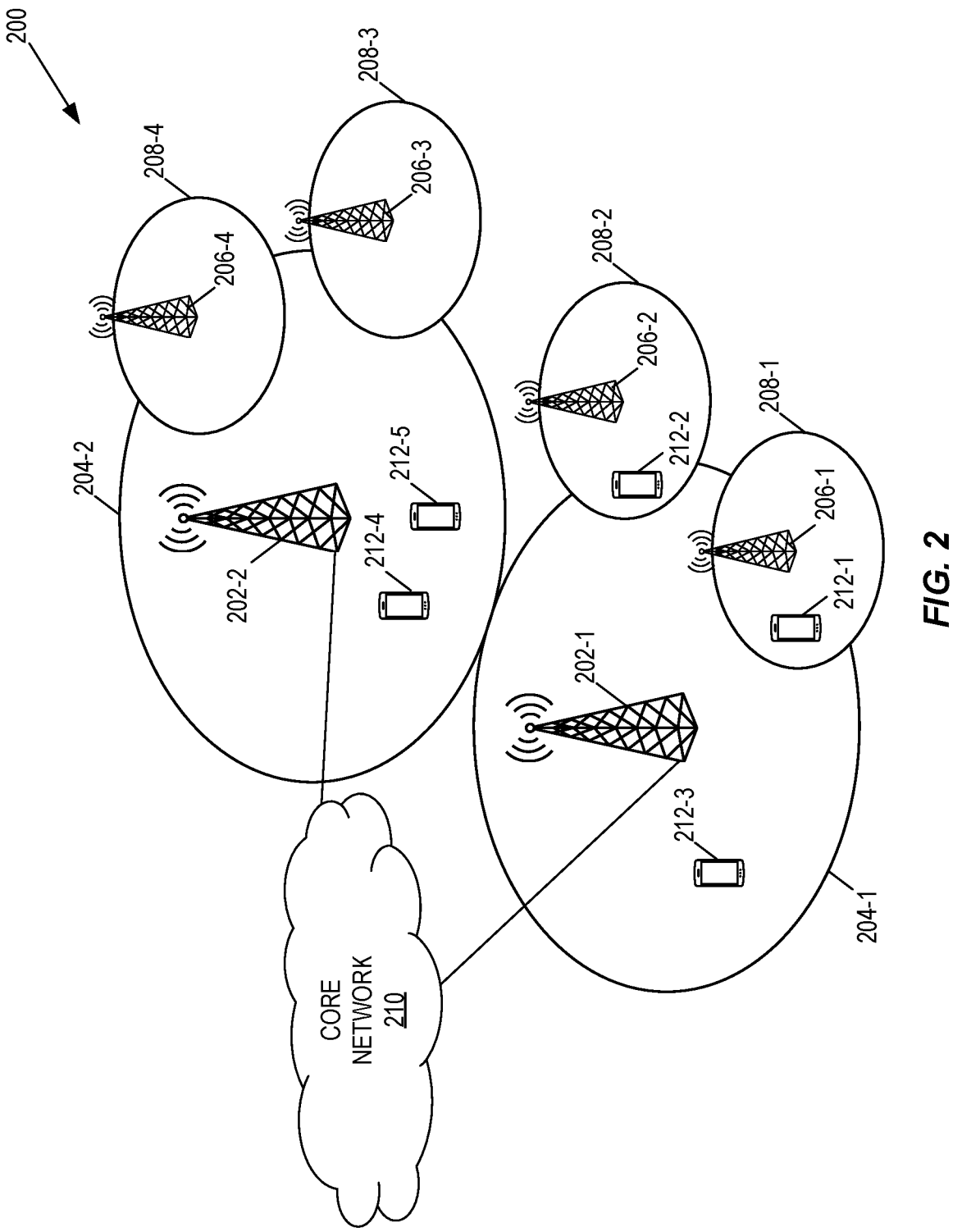
Figure 3:
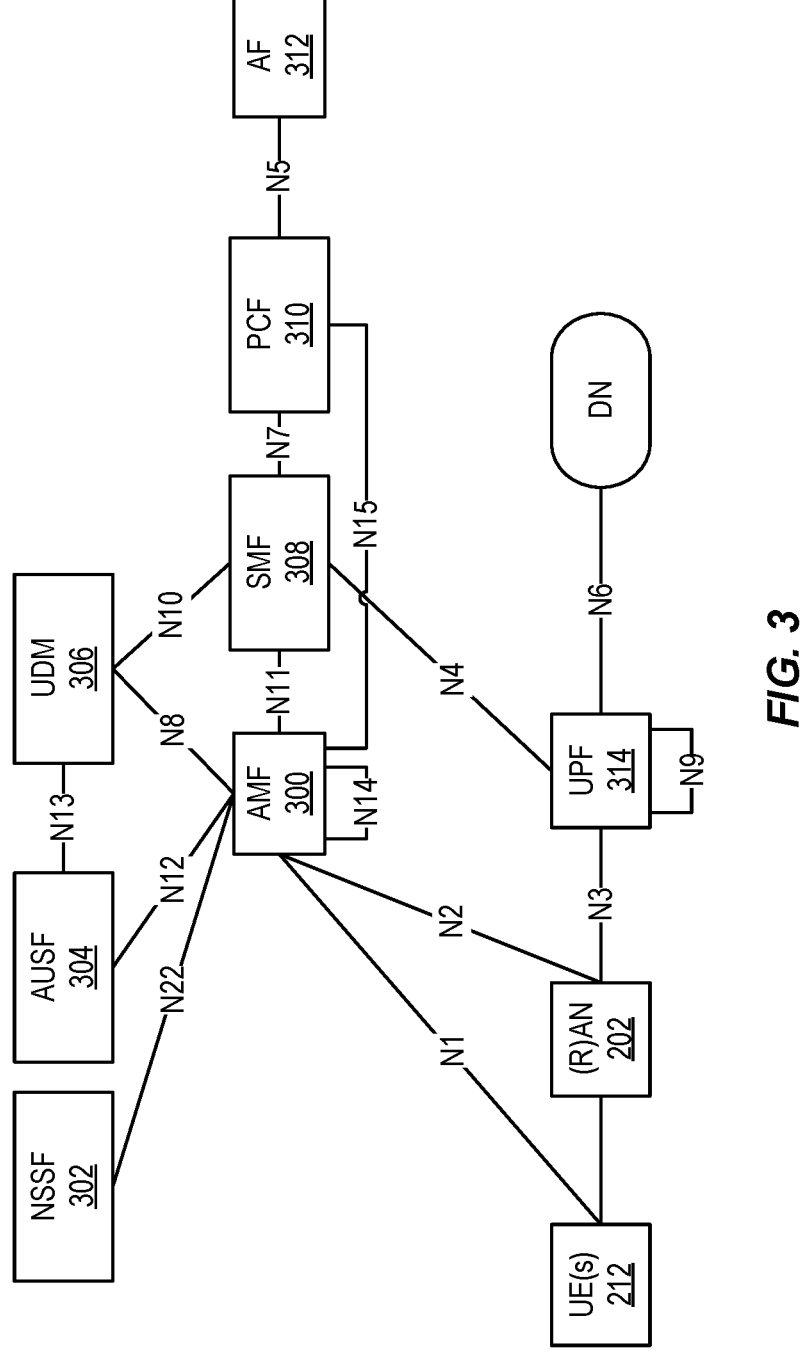
Figure 4:
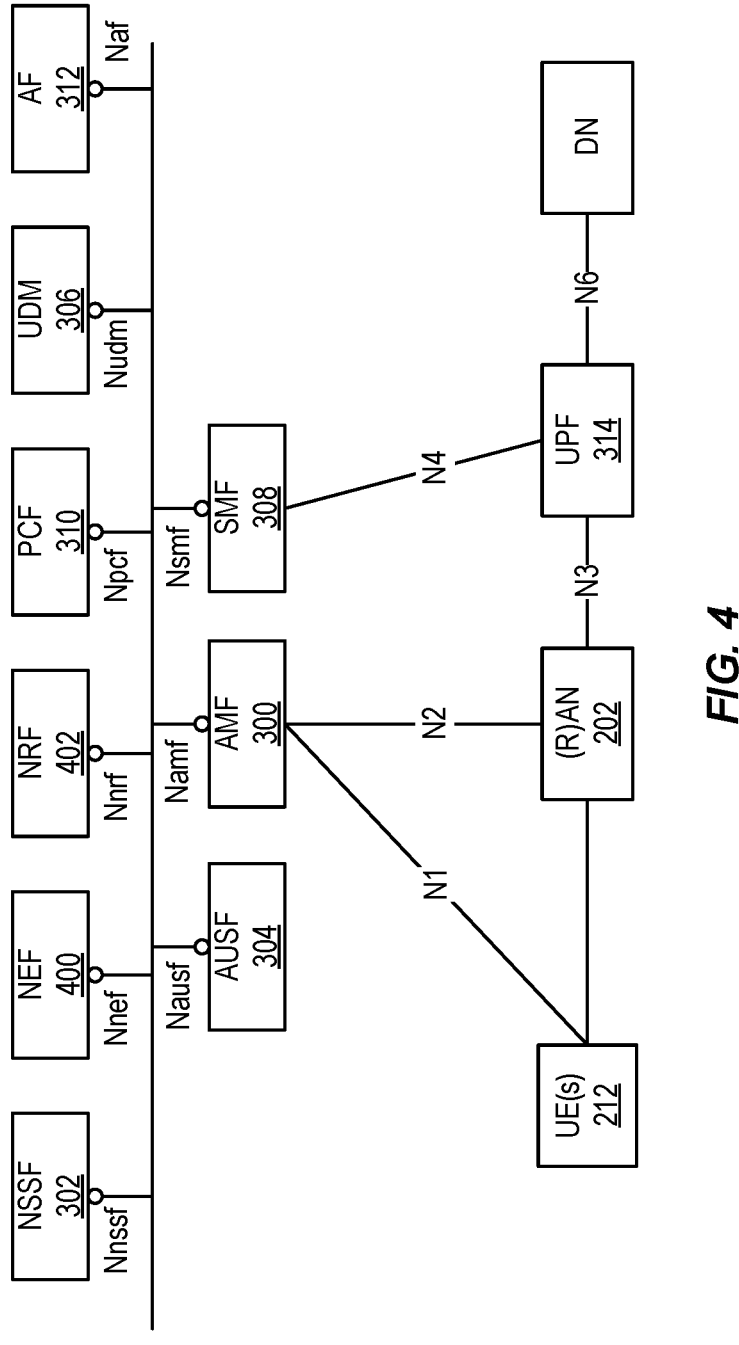
Figure 5:
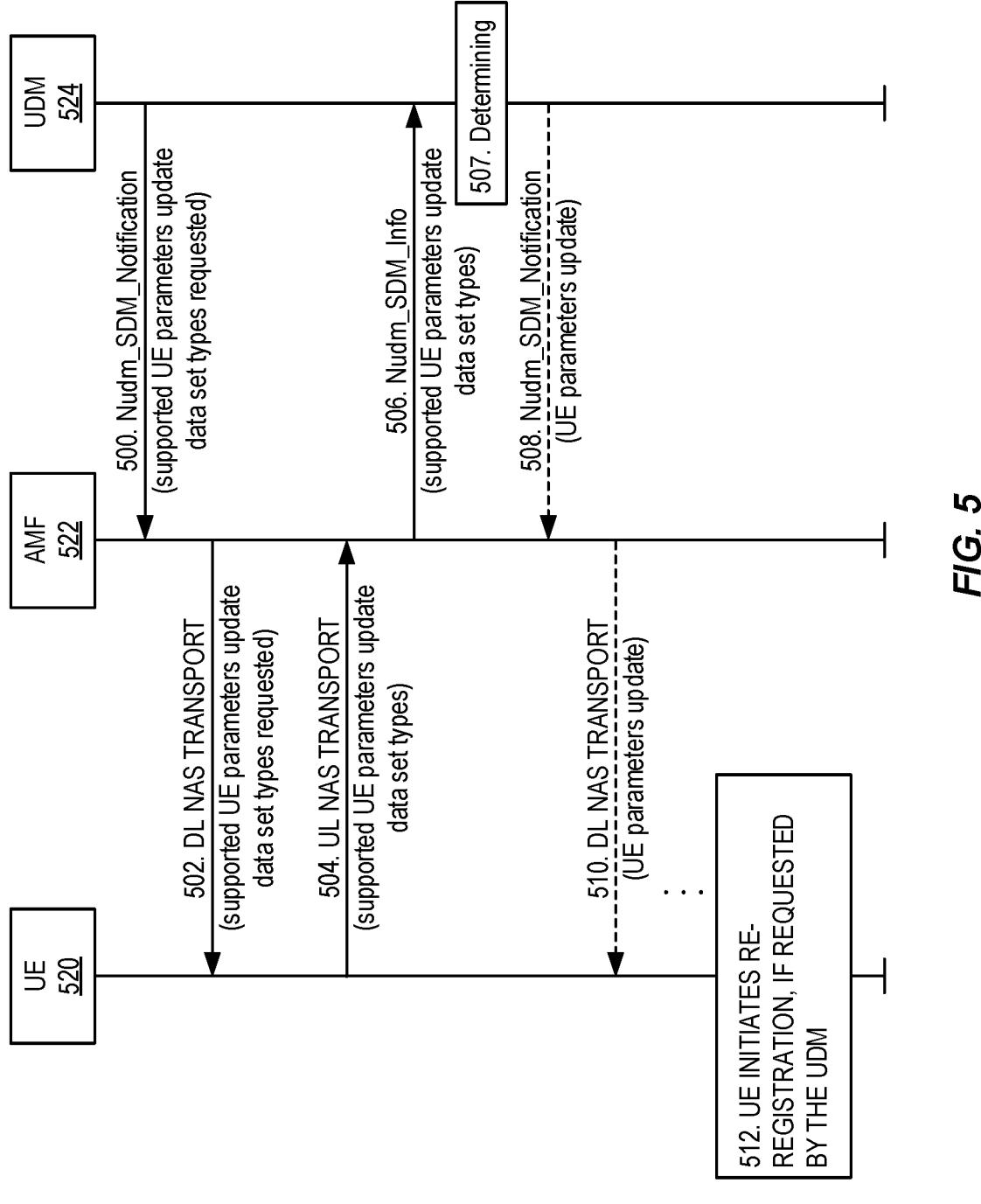
Figure 6:
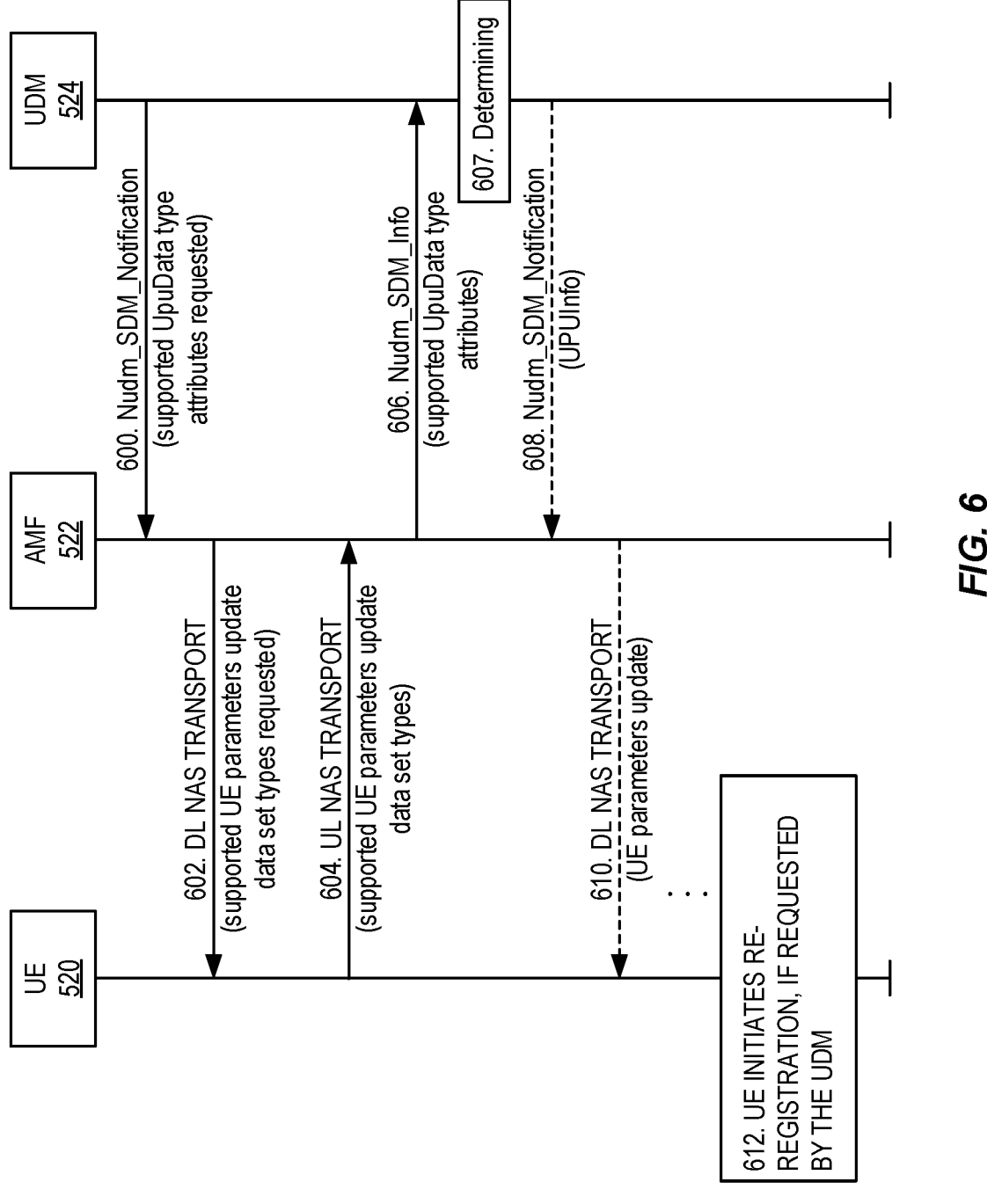
Figure 7:
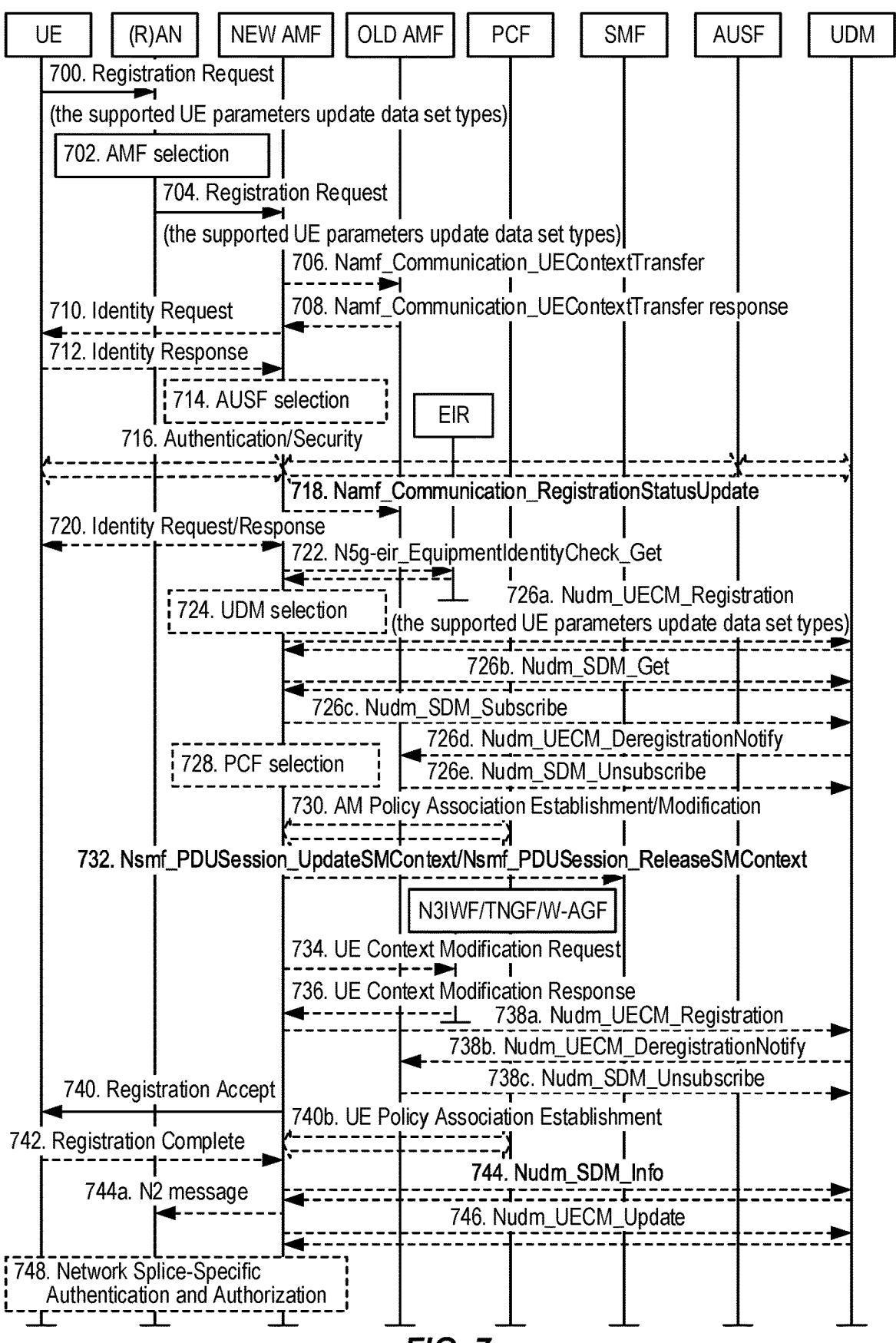
Figure 8:
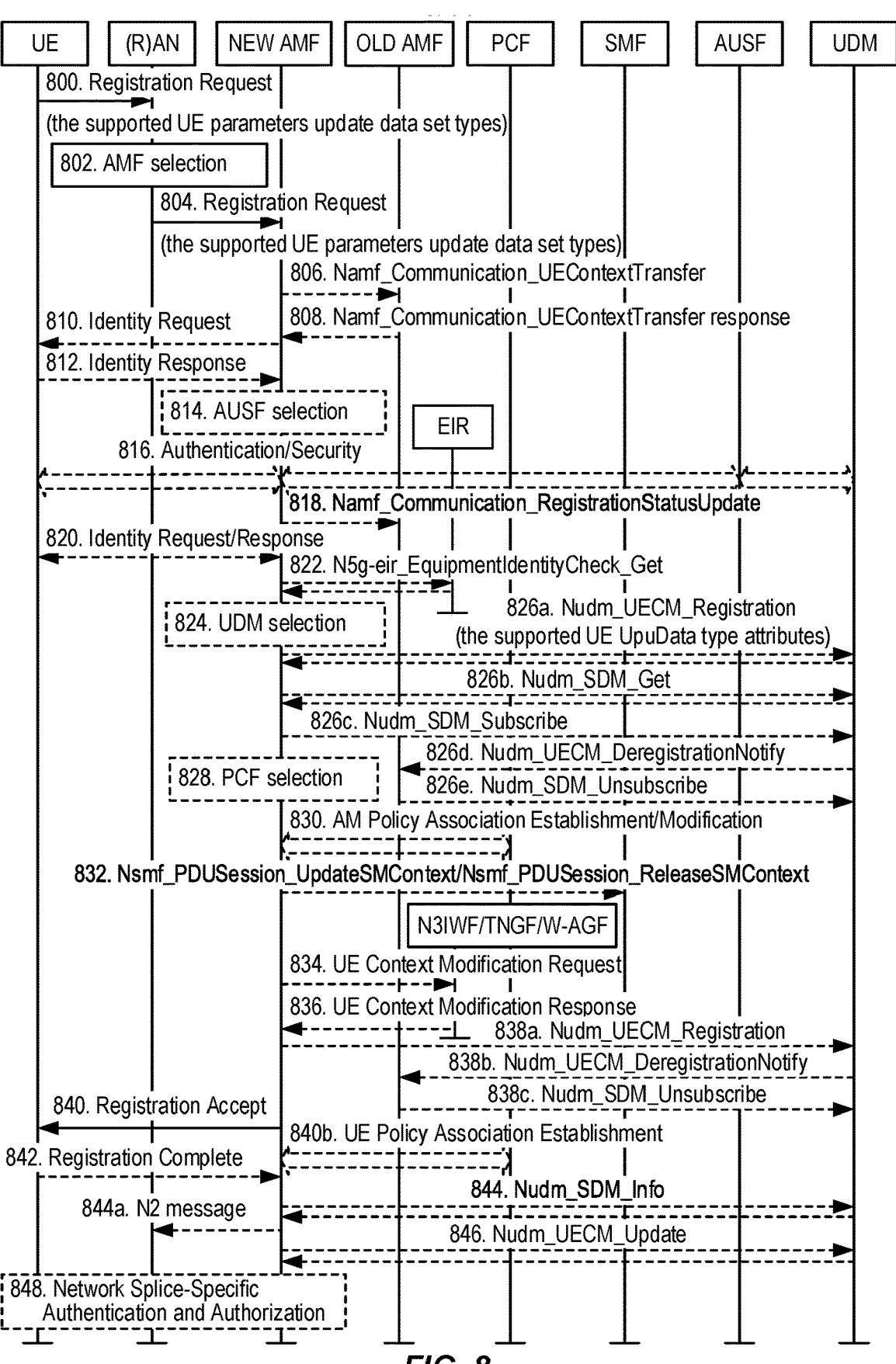
Figure 9:
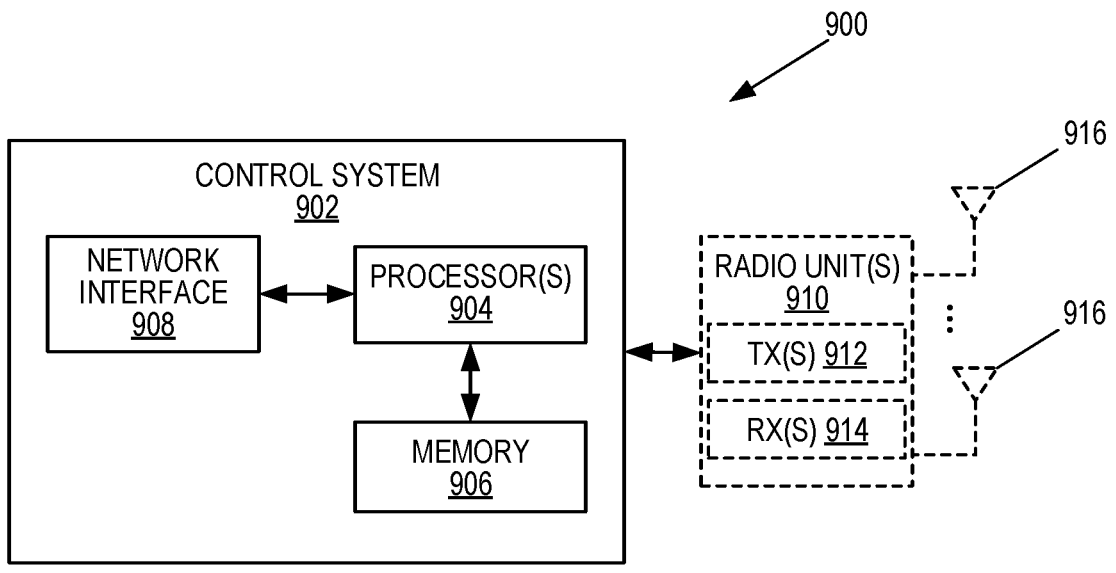
Figure 11:
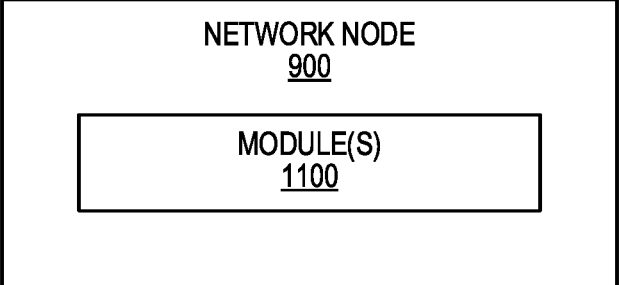
Figure 10:
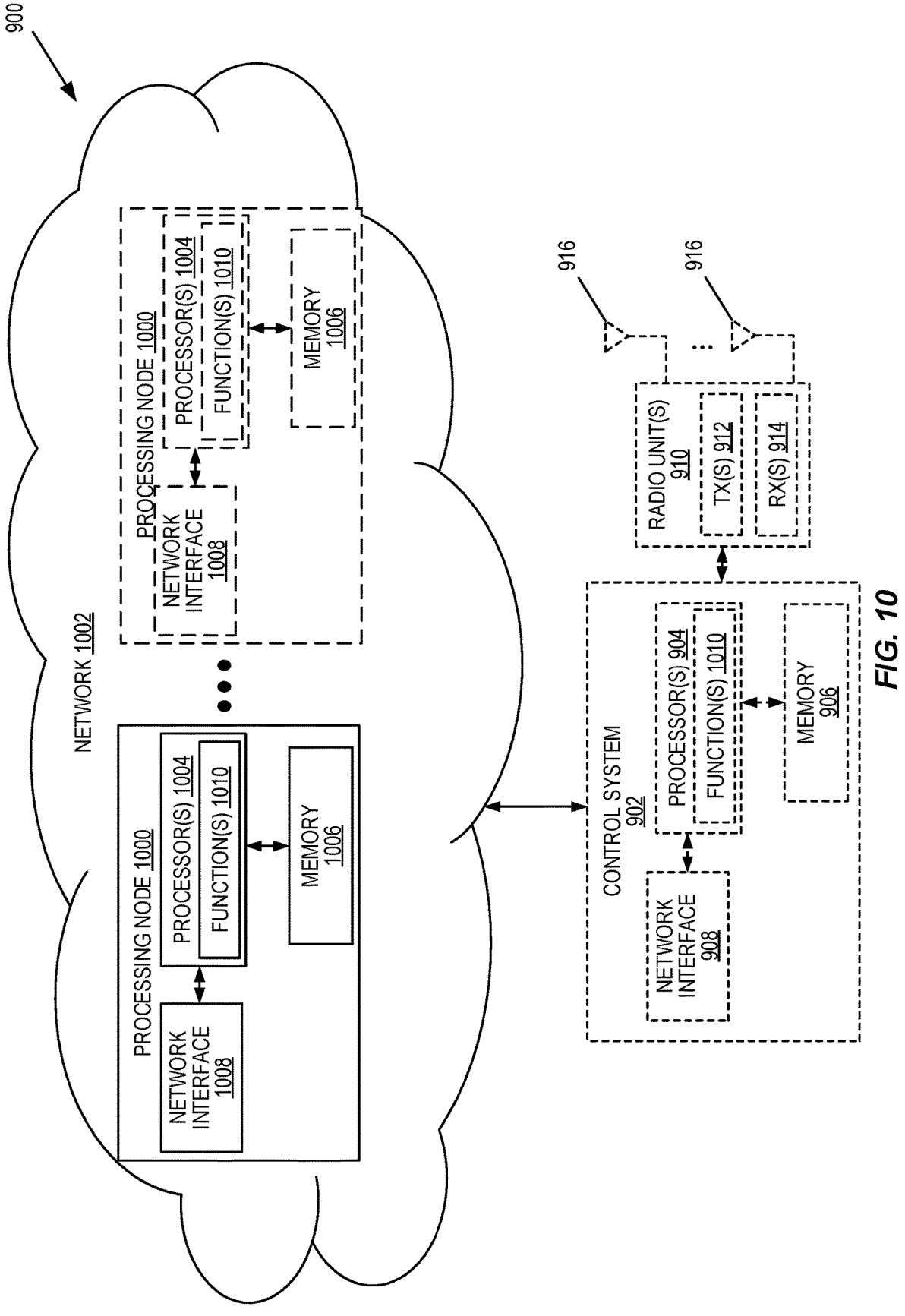
Figure 12:
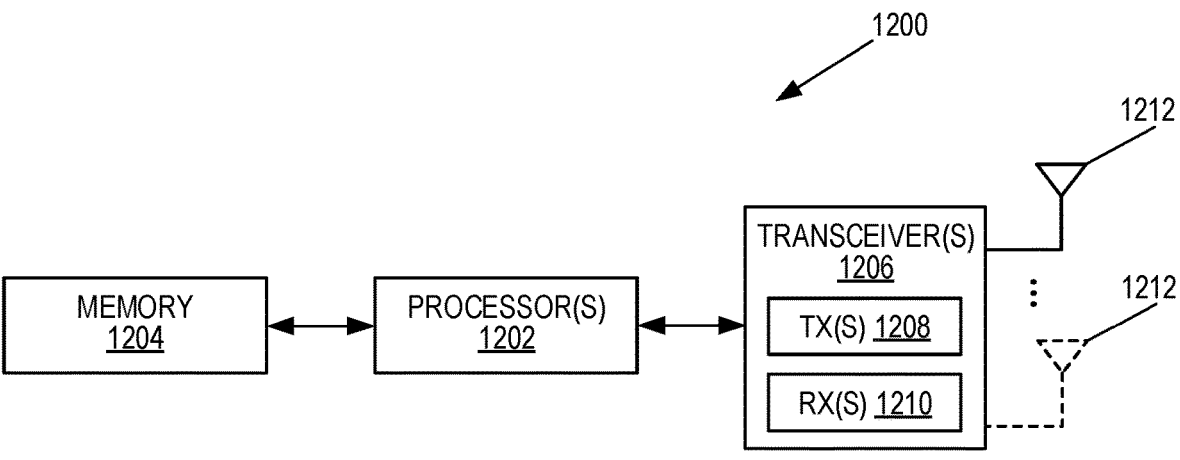
Figure 13:
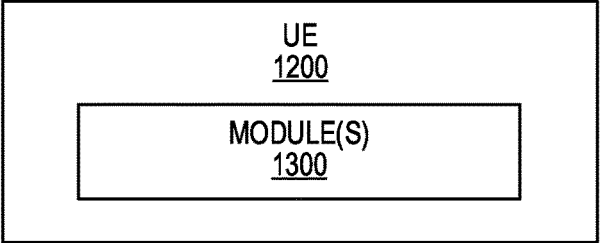

FIG. 2 illustrates one example of a cellular communications system 200 in which embodiments of the present disclosure may be implemented;

FIG. 3 illustrates a wireless communication system represented as a 5G network architecture composed of core Network Functions (NFs), where interaction between any two NFs is represented by a point-to-point reference point/interface;

FIG. 4 illustrates a 5G network architecture using service-based interfaces between the NFs in the CP, instead of the point-to-point reference points/interfaces used in the 5G network architecture of FIG. 3;

FIG. 5 is a flow diagram of the cellular communications system 200 of FIG. 2 implementing a procedure to enable the network to detect the UPU data set types supported by a UE with the AMF transparently passing the UPU transparent container between the UE and the UDM;

FIG. 6 a flow diagram of the cellular communications system 200 of FIG. 2 implementing a procedure to enable the network to detect the UPU data set types supported by a UE with the AMF interworking UE-AMF communication and AMF-UDM communication;

FIG. 7 is a flow diagram of the cellular communications system 200 of FIG. 2 implementing a procedure for the UE to indicate supported UPU data set types during initial registration with the AMF transparently passing the UPU transparent container between the UE and the UDM;

FIG. 8 is a flow diagram of the cellular communications system 200 of FIG. 2 implementing a procedure for the UE to indicate supported UPU data set types during initial registration with the AMF interworking UE-AMF communication and AMF-UDM communication;

FIG. 9 is a schematic block diagram of a network node 900 according to some embodiments of the present disclosure;

FIG. 10 is a schematic block diagram that illustrates a virtualized embodiment of the network node 900 according to some embodiments of the present disclosure;

FIG. 11 is a schematic block diagram of the network node 900 according to some other embodiments of the present disclosure;

FIG. 12 is a schematic block diagram of a wireless communication device 1200 according to some embodiments of the present disclosure;

FIG. 13 is a schematic block diagram of the wireless communication device 1200 according to some other embodiments of the present disclosure.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the documents provided in Appendix A and Appendix B.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

FIG. 2

FIG. 2 illustrates one example of a cellular communications system 200 in which embodiments of the present disclosure may be implemented. In the embodiments described herein, the cellular communications system 200 is a 5G system (5GS) including a Next Generation RAN (NG-RAN) and a 5G Core (5GC). In this example, the RAN includes base stations 202-1 and 202-2, which in the 5GS include NR base stations (gNBs) and optionally next generation eNBs (ng-eNBs) (e.g., LTE RAN nodes connected to the 5GC), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5GC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

FIG. 3

FIG. 3 illustrates a wireless communication system represented as a 5G network architecture composed of core Network Functions (NFs), where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of UEs 212 connected to either a RAN 202 or an Access Network (AN) as well as an AMF 300. Typically, the R(AN) 202 comprises base stations, e.g., such as eNBs or gNBs or similar. Seen from the core network side, the 5GC NFs shown in FIG. 3 include a NSSF 302, an AUSF 304, a UDM 306, the AMF 300, a SMF 308, a PCF 310, and an Application Function (AF) 312.

Reference point representations of the 5G network architecture are used to develop detailed call flows in the normative standardization. The N1 reference point is defined to carry signaling between the UE 212 and AMF 300. The reference points for connecting between the AN 202 and AMF 300 and between the AN 202 and UPF 314 are defined as N2 and N3, respectively. There is a reference point, N11, between the AMF 300 and SMF 308, which implies that the SMF 308 is at least partly controlled by the AMF 300. N4 is used by the SMF 308 and UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and SMF 308, respectively. N12 is required for the AMF 300 to perform authentication of the UE 212. N8 and N10 are defined because the subscription data of the UE 212 is required for the AMF 300 and SMF 308.

The 5GC network aims at separating User Plane (UP) and Control Plane (CP). The UP carries user traffic while the CP carries signaling in the network. In FIG. 3, the UPF 314 is in the UP and all other NFs, i.e., the AMF 300, SMF 308, PCF 310, AF 312, NSSF 302, AUSF 304, and UDM 306, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 300 and SMF 308 are independent functions in the CP. Separated AMF 300 and SMF 308 allow independent evolution and scaling. Other CP functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

FIG. 4

FIG. 4 illustrates a 5G network architecture using service-based interfaces between the NFs in the CP, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g., Namf for the service based interface of the AMF 300 and Nsmf for the service based interface of the SMF 308, etc. NEF 400 and NRF 402 in FIG. 4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support Quality of Service (QoS). Based on the information, the PCF 310 determines policies about mobility and session management to make the AMF 300 and SMF 308 operate properly. The AUSF 304 supports authentication function for UEs or similar and thus stores data for authentication of UEs or similar while the UDM 306 stores subscription data of the UE 212. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Some embodiments described herein provide a new procedure to enable a network (e.g., the core network 210 of FIGS. 2-4, which may be a 5GC) to detect the UE Parameters Update (UPU) data set types supported by a given UE in communication with the network. This new procedure reuses the existing interactions between the network and the UE defined for the UPU procedure as described in 3GPP Technical Specification (TS) 23.502 and TS 24.501 and as shown in FIGS. 5 and 6 below.

In some embodiments, in a first step of this new procedure the network sends the UPU transparent container to the UE. The UPU transparent container includes a new indication for "supported UE parameters update data set types requested"; the Release 15 (Rel-15) specified indication requesting the UE to send acknowledgement; and might include (or might not include) the Rel-15 specified parameter(s) (Routing Indicator and Default configured NSSAI) to be configured in the UE. In some embodiments, the UPU transparent container is integrity protected as currently defined in TS 33.501 (though this is not necessary and therefore not shown in FIGS. 5 and 6).

Since acknowledgement is requested, in a second step the UE sends to the network an acknowledgment in the UPU transparent container. Since "supported UE parameters update data set types requested" is indicated, the UE includes the supported UPU data set types (possibly excluding those specified in Rel-15) in the acknowledgment.

In a third step, the network detects the UPU data set types supported by the UE in the acknowledgment included in the UPU transparent container.

FIG. 5

FIG. 5 is a flow diagram of the cellular communications system 200 of FIG. 2 implementing a procedure to enable the network to detect the UPU data set types supported by a UE 520 with the AMF 522 transparently passing the UPU transparent container between the UE and the UDM 524. The illustrated procedure modifies FIG. 4.20.2-1 of 3GPP TS 23.502.

When the AMF transparently forwards the UPU transparent container between the UE and the UDM, the network node in the network which detects the UPU data set types supported by the UE is the UDM. If the UDM wants to send a UPU transparent container with a UPU data set type X which might not be supported by the UE (e.g., one of those specified in Rel-17 or later), the procedure of FIG. 5 is performed as described below.

First, the UDM detects the UPU data set types supported by the UE. The UDM 524 sends a request for the UPU data set types supported by the UE 520 to the AMF 522 (i.e. sends towards the UE via the AMF) by including the request in a Nudm_SDM_Notification message (step 500). The AMF forwards the request for the UPU data set types supported by the UE to the UE in a Downlink (DL) NAS transport message (step 502). Because the UDM requests acknowledgment, the UE responds to the request by including the UPU data set types supported by the UE in an Uplink (UL) NAS transport message (step 504) that is sent towards the UDM (i.e. via the AMF). The AMF forwards the UPU data set types supported by the UE in a Nudm_SDM_Info message (step 506). The procedure for the detection of the UPU data set types supported by the UE (e.g., steps 500, 502, 504, 506 and preferably 507) can be done once per registration of a UE.

Figure 1:
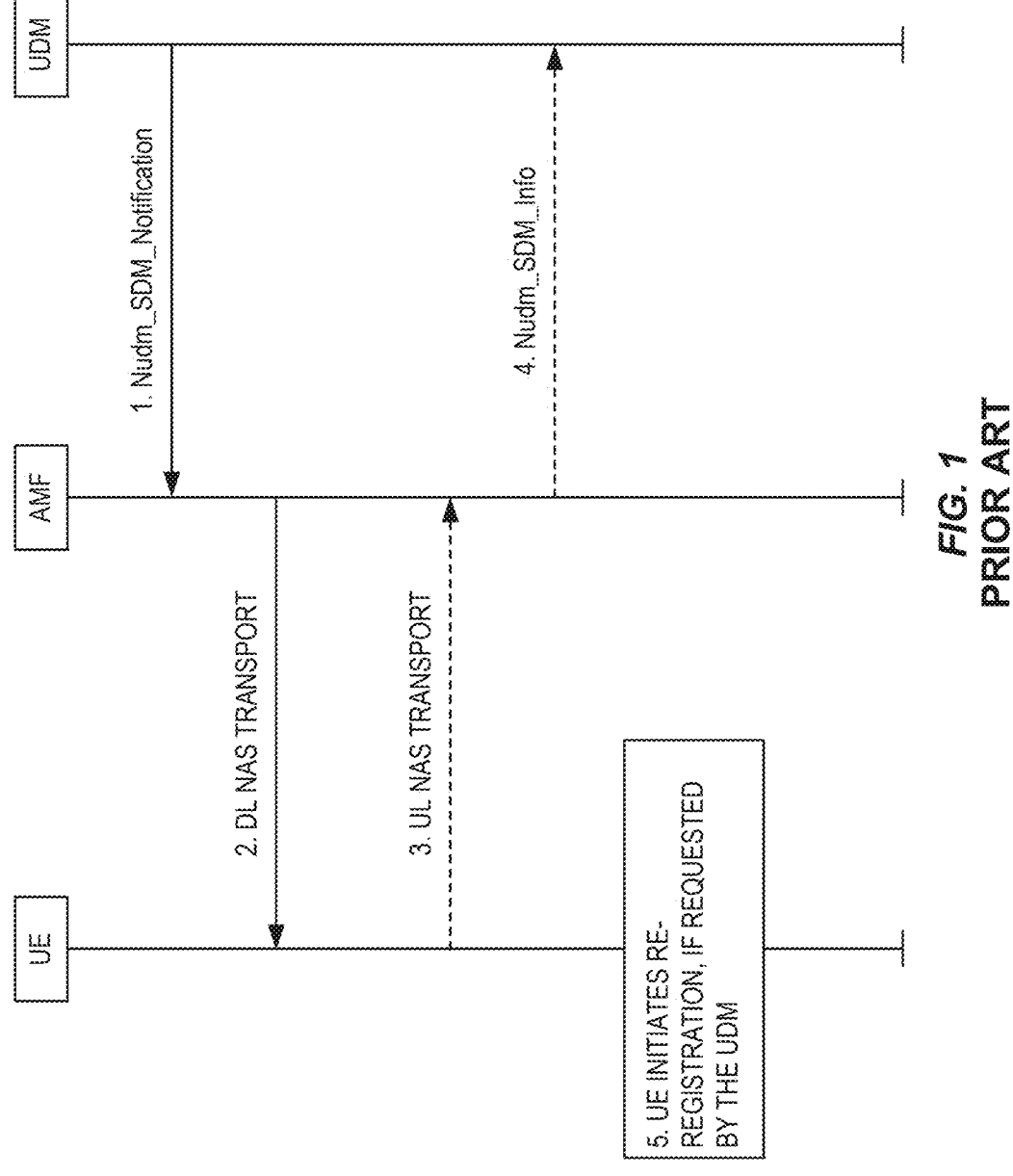
FIG. 1 is a flow diagram illustrating a UE Parameters Update (UPU) procedure via a UDM control plane procedure.

If the UDM determines in step 507, based on the UPU data set types supported by the UE received in step 506, that a given UPU data set type X is indicated as supported by the UE, the UDM sends towards the UE a UPU transparent container with the UPU data set type X. The UDM sends the UPU data with the UPU data set type X to the AMF by including the request in a Nudm_SDM_Notification message (step 508) and the AMF forwards the UPU data with the UPU data set type X to the UE in a DL NAS transport message (step 510). In some embodiments, steps 508 and 510 may be considered steps 1 and 2 of a control plane procedure as in FIG. 1, which can conclude with, if the UDM has requested the UE to re-register, the UE initiating a re-registration as in step 5 of FIG. 1 (step 512).

If the UDM determines that UPU data set type X is NOT indicated as supported in step 507, the UDM does NOT send to the UE a UPU transparent container with the given UPU data set type X.

Furthermore, in some embodiments the UDM stores the UPU data set types supported by the UE associated with the UE's Permanent Equipment Identifier (PEI) received during the UE registration in the 5GC. This allows the UDM to execute the procedure for the detection of the UPU data set types supported by the UE once per UE registration with the same PEI.

The procedure for the detection of the UPU data set types supported by the UE (e.g., steps 500, 502, 504, 506) may be triggered as a stand-alone procedure (i.e. without any update for the Routing Indicator or the Default configured NSSAI update data as described above). Alternatively, this new procedure may be triggered during the update of any of the UPU data set types currently supported.

FIG. 6

FIG. 6 is a flow diagram of the cellular communications system 200 of FIG. 2 implementing a procedure to enable the network to detect the UPU data set types supported by a UE with the AMF interworking UE-AMF communication and AMF-UDM communication.

When the AMF interworks the UPU transparent container used between the UE 520 and the AMF and the UpuData type attributes between the AMF 522 and the UDM 524, the network node in the network which detects the UPU data set types supported by the UE is the AMF. If the UDM wants to send a UPU transparent container with a UPUData type attribute which might not be supported by the UE (e.g., one of those specified in Rel-17 or later), the procedure of FIG. 4.20.2-1 of 3GPP TS 23.502 is modified such that:

upon reception of "supported UpuData type attributes requested" from the UDM, the AMF sends "supported UE parameters update data set types requested" indication in step 1; and the AMF sends to the UDM a "supported UpuData type attributes" after step 3. The "supported UpuData type attributes" includes each UpuData type attribute as specified in 3GPP TS 29.509 (except those defined in 29.509 Rel-15) supported by the AMF such that the UE indicated support for a UPU data set type related to the UpuData type attribute.

If the UDM wants to send a UpuData type attribute X which might not be supported by the AMF or for which the UE might not support the related UPU data set type (e.g., one of those specified in Rel-17 or later), the procedure of FIG. 6 is performed as described below.

The UDM first detects the supported UpuData type attributes. The UDM sends a request for the supported UPUData type attributes to the AMF (i.e. sends towards the UE via the AMF) by including the request in a Nudm_SDM_Notification message (step 600). Upon receiving the "supported UpuData type attributes requested" from the UDM, the AMF sends a request for the UPU data set types supported by the UE to the UE in a DL NAS transport message (step 602). Because the UDM requests acknowledgment, the UE responds to the request by including the UPU data set types supported by the UE in a UL NAS transport message (step 604) that is sent towards the UDM (i.e. via the AMF). The AMF then sends to the UDM a "supported UpuData type attributes" in a Nudm_SDM_Info message (step 606). The procedure for the detection of the UPU data set types supported by the UE (e.g., steps 600, 602, 604, 606 and preferably 607) can be done once per registration of a UE.

If the UDM determines in step 607, based on the UPU data set types supported by the UE received in step 606, that a given UpuData type attribute X is indicated as supported by the UE, the UDM sends to the AMF a UpuInfo with the UpuData type attribute X. The UDM sends the UPUInfo with the UPUData type attribute X to the AMF by including the UPUInfo in a Nudm_SDM_Notification message (step 608). Upon receiving the UPUInfo from the UDM, the AMF sends UPU data with a UPU data set type X to the UE in a DL NAS transport message (step 610). In some embodiments, steps 508 and 510 may be considered steps 1 and 2 of a control plane procedure as in FIG. 1, which can conclude with, if the UDM has requested the UE to re-register, the UE initiating a re-registration as in step 5 of FIG. 1 (step 612).

If the UDM determines that UpuData type attribute X is NOT indicated as supported in step 607, the UDM does not send to the AMF a UpuInfo with the UpuData type attribute X.

Furthermore, in some embodiments the UDM stores the supported UpuData type attributes associated with the UE's PEI received during the UE registration in the 5GC. This allows the UDM to execute the procedure for the detection of the supported UpuData type attributes once per UE registration with the same PEI.

The procedure for the detection of the supported UpuData type attributes (e.g., steps 500, 502, 504, 506) may be triggered as a stand-alone procedure (i.e. without any update for Routing Indicator or Default configured NSSAI update data as described above). Alternatively, this new procedure may be triggered during the update of any of the supported UpuData type attributes currently supported.

As an alternative to the procedures for detecting supported UPU data set types of FIGS. 5 and 6, in some embodiments the UE indicates the supported UPU data set types to the AMF in a REGISTRATION REQUEST during an initial registration procedure.

FIG. 7

FIG. 7 is a flow diagram of the cellular communications system 200 of FIG. 2 implementing a procedure for the UE to indicate supported UPU data set types during initial registration with the AMF transparently passing the UPU transparent container between the UE and the UDM. The illustrated procedure modifies FIG. 4.2.2.2.2-1 of 3GPP TS 23.502.

When the AMF transparently forwards the UPU transparent container between the UE and the UDM, upon receiving the supported UPU data set types in the REGISTRATION REQUEST, the AMF provides the supported UPU data set types to the UDM. The UDM stores the UPU data set types supported by the UE as part of the AMF registration context for the UE.

The registration procedure begins with a Registration Request from the UE to the (R)AN, which includes the UPU data set types supported by the UE (step 700). The (R)AN selects an AMF (step 702), and the (R)AN forwards the Registration Request, including the UPU data set types supported by the UE, to the AMF (step 704). If needed (e.g., changing from an old AMF to a new AMF), the UE Context is transferred and related operations are performed as in steps 4-12 of clause 4.2.2.2.2 of 3GPP TS 23.502 (steps 706, 708, 710, 712, 714, 716, 718, 720, 722). The AMF selects a UDM (step 724), and the AMF provides the UPU data set types supported by the UE to the UDM in a Nudm_UECM_Registration message (step 726a). The remaining registration operations as in steps 14b-25 of clause 4.2.2.2.2 of 3GPP TS 23.502 are performed (steps 726a-e, 728, 730, 732, 734, 736, 738a-c, 740, 740b, 742, 744, 744a, 746, 748).

If the UDM wants to send a UPU transparent container with a UPU data set type X which might not be supported by the UE (e.g., one of those specified in Rel-17 or later):

if the UPU data set type X is indicated as supported during the registration as above, the UDM sends a UPU transparent container to the UE with the UPU data set type X (e.g., using the procedure of FIG. 1); and if the UPU data set type X is NOT indicated as supported during the registration as above, the UDM does NOT send a UPU transparent container to the UE with the UPU data set type X.

FIG. 8

FIG. 8 is a flow diagram of the cellular communications system 200 of FIG. 2 implementing a procedure for the UE to indicate supported UPU data set types during initial registration with the AMF interworking UE-AMF communication and AMF-UDM communication. The illustrated procedure modifies FIG. 4.2.2.2.2-1 of 3GPP TS 23.502.

When the AMF interworks the UPU transparent container used between the UE and the AMF and the UpuData type attributes between the AMF and the UDM, upon receiving the supported UPU data set types in the REGISTRATION REQUEST, the AMF indicates to the UDM the "supported UpuData type attributes". The "supported UpuData type attributes" includes each UpuData type attribute as specified in 3GPP TS 29.509 (except those defined in 29.509 Rel-15) supported by the AMF such that the UE indicated support for a UPU data set type related to the UpuData type attribute in the REGISTRATION REQUEST.

The registration procedure begins with a Registration Request from the UE to the (R)AN, which includes the UPU data set types supported by the UE (step 800). The (R)AN selects an AMF (step 802), and the (R)AN forwards the Registration Request, including the UPU data set types supported by the UE, to the AMF (step 804). If needed (e.g., changing from an old AMF to a new AMF), the UE Context is transferred and related operations are performed as in steps 4-12 of clause 4.2.2.2.2 of 3GPP TS 23.502 (steps 806, 808, 810, 812, 814, 816, 818, 820, 822). The AMF selects a UDM (step 824), and the AMF provides the supported UpuData type attributes to the UDM in a Nudm_UECM_Registration message (step 826*a*). The remaining registration operations as in steps 14b-25 of clause 4.2.2.2.2 of 3GPP TS 23.502 are performed (steps 826*a-e*, 828, 830, 832, 834, 836, 838*a-c*, 840, 840*b*, 842, 844, 844*a*, 846, 848).

If the UDM wants to send a UpuData type attribute X which might not be supported by the AMF or for which the UE might not support the related UPU data set type (e.g., one of those specified in Rel-17 or later):

if the UpuData type attribute X is indicated as supported in "supported UpuData type attributes", the UDM sends to the AMF a UpuInfo with the UpuData type attribute X (e.g., using the procedure of FIG. 1); and if the UpuData type attribute X is NOT indicated as supported in "supported UpuData type attributes", the UDM does not send to the AMF a UpuInfo with the UpuData type attribute X.

FIG. 9

FIG. 9 is a schematic block diagram of a network node 900 according to some embodiments of the present disclosure. Optional features are represented by dashed boxes. The network node 900 may be, for example, a base station 202 or 206 or another network node (e.g., an AMF, a UDM). In some embodiments, the network node implements all or part of the functionality of the base station 202 or gNB described herein. As illustrated, the network node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In addition, the network node 900 may include one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a network node 900 as described herein. In some embodiments, the function(s) are implemented in software that is stored, e.g., in the memory 906 and executed by the one or more processors 904.

FIG. 10

FIG. 10 is a schematic block diagram that illustrates a virtualized embodiment of the network node 900 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 900 in which at least a portion of the functionality of the network node 900 is implemented as a virtual component(s) (e.g., via a virtual machine(s) executing on a physical processing node(s) in a network(s)). As illustrated, in this example, the network node 900 may include the control system 902 and/or the one or more radio units 910, as described above. The control system 902 may be connected to the radio unit(s) 910 via, for example, an optical cable or the like. The network node 900 includes one or more processing nodes 1000 coupled to or included as part of a network(s) 1002. If present, the control system 902 or the radio unit(s) 910 are connected to the processing node(s) 1000 via the network 1002. Each processing node 1000 includes one or more processors 1004 (e.g., CPUs, ASICs, FPGAs, and/or the like), memory 1006, and a network interface 1008.

In this example, functions 1010 of the network node 900 described herein are implemented at the one or more processing nodes 1000 or distributed across the one or more processing nodes 1000 and the control system 902 and/or the radio unit(s) 910 in any desired manner. In some particular embodiments, some or all of the functions 1010 of the network node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of network node 900 or a node (e.g., a processing node 1000) implementing one or more of the functions 1010 of the network node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 11

FIG. 11 is a schematic block diagram of the network node 900 according to some other embodiments of the present disclosure. The network node 900 includes one or more modules 1100, each of which is implemented in software. The module(s) 1100 provide the functionality of the network node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

FIG. 12

FIG. 12 is a schematic block diagram of a wireless communication device 1200 according to some embodiments of the present disclosure. As illustrated, the wireless communication device 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry. In some embodiments, the functionality of the wireless communication device 1200 described above may be fully or partially implemented in software that is, e.g., stored in the memory 1204 and executed by the processor(s) 1202. Note that the wireless communication device 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the wireless communication device 1200 and/or allowing output of information from the wireless communication device 1200), a power supply (e.g., a battery and associated power circuitry), etc.

In some embodiments, a computer program including instructions which, when executed by at least one processor, causes the at least one processor to carry out the functionality of the wireless communication device 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 13

FIG. 13 is a schematic block diagram of the wireless communication device 1200 according to some other embodiments of the present disclosure. The wireless communication device 1200 includes one or more modules

1300, each of which is implemented in software. The module(s) 1300 provide the functionality of the wireless communication device 1200 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

APPENDIX A

3GPP TSG-CT WG1 Meeting #125-e  C1-20abcd
Electronic meeting; 20-28 August 2020

| | |
|---|---|
| Source: | Ericsson |
| Title: | Discussion on UE parameters update transparent container with an unsupported UE parameters update data set type |
| Agenda item: | 17.2.2.1 |
| Document for: | Agreement |

1. Abstract

This paper:

- identifies that including an UE parameters update data set type not supported by the UE in a UE parameters update transparent container sent to the UE during the UE parameters update via UDM control plane procedure results into undesirable loss of information.

- proposes to enable the network to obtain the UE parameters update data set types supported by the UE.

2. Discussion

2.1 Problem

The unassigned code points of the UE parameters update data set type field of the UE parameters update transparent container are handled as "reserved" - see excerpt from TS 24.501 table 9.11.3.53A.1:

```
UE parameters update data set type
Bits
4 3 2 1
0 0 0 1 Routing indicator update data
0 0 1 0 Default configured NSSAI update data All other values are reserved
```

If a new UE parameters update data set type is specified in Rel-17 and sent by a Rel-17 network to a pre-Rel-17 UE during the UE parameters update via UDM control plane procedure specified in TS 23.502 subclause 4.20, the pre-Rel-17 UE:

- will consider the new code point of the UE parameters update data set type field as "reserved";

- will consider the entire Payload container IE containing the UE parameters update transparent container as syntactically incorrect; and

- will ignore the entire Payload container IE containing the UE parameters update transparent container.

In such case, all pieces of information provided in the UE parameters update transparent container will be lost.

Moreover, if the UE parameters update transparent container is included in the Payload container IE of the "multiple payloads" payload container type, all pieces of information in all other payload container entries (e.g. 5GSM message, SMS message, LCS message, ...) of the Payload container IE will be lost too.

Furthermore, the UE will not send any acknowledgement to the network as the acknowledgement is sent as confirmation of successful storage of all the received parameters.

> Observation-1: **Including a UE parameters update data set type *not supported* by the UE in a UE parameters update transparent container sent to the UE during the UE parameters update via UDM control plane procedure results into undesirable loss of information. This loss impacts all the parameters in the UE parameters update transparent container and possibly also messages of other protocols transported in the same DL NAS TRANSPORT message.**

In order to avoid such loss of information and to avoid waste of radio resources needed for the transport of the information, the network should include only the UE parameters update data set types supported by the UE in the UE parameters update transparent container.

However, the network has no means to detect what the UE parameters update data set types supported by the UE are.

> Observation-2: **To avoid the issue, the network needs to include *solely* UE parameters update data set types *supported* by the UE in a UE parameters update transparent container sent to the UE. There is no way how to do so.**

2.2 Solution

2.2.1 General

Thus, it is proposed to specify means for the network to detect the UE parameters update data set types supported by the UE.

> Proposal-1: Enable the network to detect the UE parameters update data set types supported by the UE.

2.2.2 Alternative 1 - the network pulls information from the UE

The network detects the UE parameters update data set types supported by the UE as follows:

1) the network sets one of the spare bits of the UE parameters update transparent container sent in downlink to indicate that the supported UE parameters update data set types are requested; and 2) if acknowledgement is requested and the supported UE parameters update data set types are requested, the Rel-17 UE includes the supported UE parameters update data set types (excluding those specified in Rel-15) in the acknowledgment in the UE parameters update transparent container sent in uplink.

NOTE 2: Pre-Rel-17 UE will ignore the spare bit and handle the rest of the UE parameters update transparent container according to pre-Rel-17 TS procedures.

The network does not send to the UE a UE parameters update transparent container with the UE parameters update data set type defined in Rel-17 and not indicated as supported by the UE.

2.2.3 Alternative 2 - the UE pushes information to the network

The network detects the UE parameters update data set types supported by the UE as follows:

1) the UE indicates the UE parameters update data set types supported by the UE in the REGISTRATION REQUEST of the initial registration.

The network does not send to the UE a UE parameters update transparent container with the UE parameters update data set type defined in Rel-17 and not indicated as supported by the UE.

2.3 Evaluation

Both alternative 1 and alternative 2 have impact on the UE and the network.

Alternative 1 requires 2 additional messages, exchanged before the network sends Rel-17 parameters of UE parameters update data set types specified in Rel-17 or later.

Alternative 2 requires an additional indications included in every initial registration request by a UE supporting a UE parameters update data set type specified in Rel-17 or later.

It is assumed that the UE parameters update via UDM control plane procedure is performed rarely. If so, alternative 1 is preferred as requiring less radio resource.

Proposal-2: The network detects the UE parameters update data set types supported by the UE by enhancements the UE parameters update transparent container IE in the NAS.

3. Conclusions

Observation-1: **Including a UE parameters update data set type \*not supported\* by the UE in a UE parameters update transparent container sent to the UE during the UE parameters update via UDM control plane procedure results into undesirable loss of information. This loss impacts all the parameters in the UE parameters update transparent container and possibly also messages of other protocols transported in the same DL NAS TRANSPORT message.**

Observation-2: **To avoid the issue, the network needs to include \*solely\* UE parameters update data set types \*supported\* by the UE in a UE parameters update transparent container sent to the UE. There is no way how to do so.**

Proposal-1: Enable the network to detect the UE parameters update data set types supported by the UE.

Proposal-2: The network detects the UE parameters update data set types supported by the UE by enhancements the UE parameters update transparent container IE in the NAS.

4. Proposal

It is proposed to discuss the above and agree CR C1-20abcd.

APPENDIX B

3GPP TSG-CT WG1 Meeting #125-e C1-20wxyz
Electronic meeting, 20-28 August 2020

CR-Form-v12.0

CHANGE REQUEST

24.501 CR abcd rev - Current version: 16.5.1

*For HELP on using this form: comprehensive instructions can be found at http://www.3gpp.org/Change-Requests.*

*Proposed change affects:* UICC apps☐ ME☒ Radio Access Network☐ Core Network☐

| Title: | UE parameters update transparent container with an unsupported UE parameters update data set type |
|---|---|
| Source to WG: | Ericsson |
| Source to TSG: | C1 |
| Work item code: | 5GProtoc17 | Date: 2020-08-12 |
| Category: | B | Release: Rel-17 |
| | Use one of the following categories: | Use one of the following releases: |

| | |
|---|---|
| *F* *(correction)* | *Rel-8* *(Release 8)* |
| *A* *(mirror corresponding to a change in an earlier release)* | *Rel-9* *(Release 9)* |
| | *Rel-10* *(Release 10)* |
| *B* *(addition of feature),* | *Rel-11* *(Release 11)* |
| *C* *(functional modification of feature)* | *Rel-12* *(Release 12)* |
| *D* *(editorial modification)* | *Rel-13* *(Release 13)* |
| Detailed explanations of the above categories can | *Rel-14* *(Release 14)* |
| be found in 3GPP <u>TR 21.900</u>. | *Rel-15* *(Release 15)* |
| | *Rel-16* *(Release 16)* |

| | |
|---|---|
| Reason for change: | A UDM including an UE parameters update data set type *not supported* by the UE in a UE parameters update transparent container sent to the UE during the UE parameters update via UDM control plane procedure results into undesirable loss of information. This loss impacts all the parameters in the UE parameters update transparent container and possibly also messages of other protocols transported in the same DL NAS TRANSPORT message.<br><br>To avoid the issue, the UDM needs to include *solely* UE parameters update data set types *supported* by the UE in a UE parameters update transparent container sent to the UE.<br><br>To enable usage of solution in both at home and when roaming, the solution cannot require enhancements in the AMF. |
| Summary of change: | The UDM detects the UE parameters update data set types supported by the UE by using enhancements of the UE parameters update transparent container IE. |
| Consequences if not approved: | Loss of all the parameters in the UE parameters update transparent container sent in downlink and possibly also messages of other protocols transported in the same DL NAS TRANSPORT message. |

Clauses affected: 5.4.5.3.3, 9.11.3.53A

| | Y | N | | |
|---|---|---|---|---|
| Other specs affected: (show related CRs) | | X | Other core specifications | TS/TR ... CR ... |
| | | X | Test specifications | TS/TR ... CR ... |
| | | X | O&M Specifications | TS/TR ... CR ... |

Other comments:

This CR's revision history:

*** change ***

5.4.5.3.3 Network-initiated NAS transport of messages

Upon reception of a DL NAS TRANSPORT message, the UE shall stop the timer T3346 if running.

Upon reception of a DL NAS TRANSPORT message, if the Payload container type IE is set to:

a) "N1 SM information" and the 5GMM cause IE is not included in the DL NAS TRANSPORT message, the 5GSM message in the Payload container IE and the PDU session ID are handled in the 5GSM procedures specified in clause 6;

b) "SMS", the UE shall forward the content of the Payload container IE to the SMS stack entity;

c) "LTE Positioning Protocol (LPP) message container", the UE shall forward the payload container type, the content of the Payload container IE and the routing information included in the Additional information IE to the upper layer location services application;

d) "SOR transparent container" and if the Payload container IE:

1) successfully passes the integrity check (see 3GPP TS 33.501 [24]), indicates a list of preferred PLMN/access technology combinations is provided and the list type indicates:

i) "PLMN ID and access technology list", then the ME shall replace the highest priority entries in the "Operator Controlled PLMN Selector with Access Technology" list stored in the ME and shall proceed with the behaviour as specified in 3GPP TS 23.122 [5] annex C; or ii) "secured packet", then the ME shall behave as if a SMS is received with protocol identifier set to SIM data download, data coding scheme set to class 2 message and SMS payload as secured packet contents of SOR transparent container IE. The SMS payload is forwarded to UICC as specified in 3GPP TS 23.040 [4A] and the ME shall proceed with the behaviour as specified in 3GPP TS 23.122 [5] annex C; or 2) does not successfully pass the integrity check (see 3GPP TS 33.501 [24]) then the UE shall proceed with the behaviour as specified in 3GPP TS 23.122 [5] annex C.

e) Void;

f) Void;

g) "N1 SM information" and:

1) the 5GMM cause IE is set to the 5GMM cause #22 "Congestion", the UE passes to the 5GSM sublayer an indication that the 5GSM message was not forwarded due to DNN based congestion control along with the 5GSM message from the Payload container IE of the DL NAS TRANSPORT message, and the time value from the Back-off timer value IE;

2) the 5GMM cause IE is set to the 5GMM cause #28 "Restricted service area", the UE passes to the 5GSM sublayer an indication that the 5GSM message was not forwarded due to service area restrictions along with the 5GSM message from the Payload container IE of the DL NAS TRANSPORT message, enters the state 5GMM-REGISTERED.NON-ALLOWED-SERVICE and, if the DL NAS TRANSPORT message is received over 3GPP access, performs the registration procedure for mobility and periodic registration update (see subclauses 5.3.5 and 5.5.1.3);

3) the 5GMM cause IE is set to the 5GMM cause #65 "maximum number of PDU sessions reached", the UE passes to the 5GSM sublayer an indication that the 5GSM message was not forwarded because the PLMN's maximum number of PDU sessions has been reached, along with the 5GSM message from the Payload container IE of the DL NAS TRANSPORT message;

4) the 5GMM cause IE is set to the 5GMM cause #67 "insufficient resources for specific slice and DNN", the UE passes to the 5GSM sublayer an indication that the 5GSM message was not forwarded due to S-NSSAI and DNN based congestion control along with the 5GSM message from the Payload container IE of the DL NAS TRANSPORT message, and the time value from the Back-off timer value IE;

5) the 5GMM cause IE is set to the 5GMM cause #69 "insufficient resources for specific slice", the UE passes to the 5GSM sublayer an indication that the 5GSM message was not forwarded due to S-NSSAI only based congestion control along with the 5GSM message from the Payload container IE of the DL NAS TRANSPORT message, and the time value from the Back-off timer value IE;

6) the 5GMM cause IE is set to the 5GMM cause #90 "payload was not forwarded", the UE passes to the 5GSM sublayer an indication that the 5GSM message was not forwarded due to routing failure along with the 5GSM message from the Payload container IE of the DL NAS TRANSPORT message;

7) the 5GMM cause IE is set to the 5GMM cause #91 "DNN not supported or not subscribed in the slice", the UE passes to the 5GSM sublayer an indication that the 5GSM message was not forwarded because the DNN is not supported or not subscribed in a slice along with the 5GSM message from the Payload container IE of the DL NAS TRANSPORT message;

8) the 5GMM cause IE is set to the 5GMM cause #92 "insufficient user-plane resources for the PDU session", the UE passes to the 5GSM sublayer an indication that the 5GSM message was not forwarded due to insufficient user-plane resources along with the 5GSM message from the Payload container IE of the DL NAS TRANSPORT message.

h) "UE policy container", the UE policy container in the Payload container IE is handled in the UE policy delivery procedures specified in Annex D;

i) "UE parameters update transparent container" and if the Payload container IE 1) successfully passes the integrity check (see 3GPP TS 33.501 [24]):

i) if the UE parameters update list includes a UE parameters update data set with UE parameters update data set type indicating "Routing indicator update data", A) the ME shall behave as if an SMS is received with protocol identifier set to SIM data download, data coding scheme set to class 2 message and SMS payload as secured packet contents of UE parameters update transparent container IE. The SMS payload is forwarded to UICC as specified in 3GPP TS 23.040 [4A]; and B) if the ACK bit of the UE parameters update header in the UE parameters update transparent container is set to "acknowledgment requested" and if the ME receives status bytes from the UICC indicating that the UICC has received the secured packet successfully, the ME shall send an acknowledgement in the Payload container IE of an UL NAS TRANSPORT message with Payload type IE set to "UE parameters update transparent container" as specified in subclause 5.4.5.2.2. If the supported UE parameters update data set types request bit of the UE parameters update header of the received UE parameters update transparent container indicates "supported UE parameters update data set types requested", the UE shall include the supported UE parameters update data set types list in the sent acknowledgement. The UE shall include all supported UE parameters update data set types excluding "routing indicator update data" and "default configured NSSAI update data" in the supported UE parameters update data set types list. If the UE supports odd amount of the UE parameters update data set types, the UE shall include one of the supported UE parameters update data set types in the supported UE parameters update data set types list twice; and C) if the ME receives a REFRESH command from the UICC as specified in 3GPP TS 31.111 [22A] and if the REG bit of the UE parameters update header in the UE parameters update transparent container IE is set to "re-registration requested", and:

C1)   the UE is registered over 3GPP access, then the UE shall wait until it enters 5GMM-IDLE mode over 3GPP access or 5GMM-CONNECTED mode with RRC inactive indication, and then perform a de-registration procedure, delete its 5G-GUTI and initiate a registration procedure for initial registration as specified in subclause 5.5.1.2;

C2)   the UE is registered over non-3GPP access and does not have emergency services ongoing over non-3GPP access, then the UE shall locally release the N1 NAS signalling connection and enter 5GMM-IDLE mode over non-3GPP access, perform a de-registration procedure, delete its 5G-GUTI if the UE is registered to different PLMN on 3GPP access or the UE is not registered over 3GPP access, and then initiate a registration procedure for initial registration as specified in subclause 5.5.1.2; and C3)   the UE is registered over non-3GPP access and has an emergency services ongoing over non-3GPP access, then the UE shall wait until the emergency services are completed before locally releasing the N1 NAS signalling connection and enter 5GMM-IDLE mode over non-3GPP access, perform a de-registration procedure, delete its 5G-GUTI if the UE is registered to different PLMN on 3GPP access or if the UE is not registered over 3GPP access, and then initiate a registration procedure for initial registration as specified in subclause 5.5.1.2.

ii) if the UE parameters update list includes a UE parameters update data set with UE parameters update data set type indicating "Default configured NSSAI update data", A) if the ACK bit of the UE parameters update header in the UE parameters update transparent container is set to "acknowledgment requested" and if the UE parameters update list does not include a UE parameters update data set with UE parameters update data set type indicating "Routing indicator update data", the ME shall send an acknowledgement in the Payload container IE of an UL NAS TRANSPORT message with Payload type IE set to "UE parameters update transparent container" as specified in subclause 5.4.5.2.2. If the supported UE parameters update data set types request bit of the UE parameters update header of the received UE parameters update transparent container indicates "supported UE parameters update data set types requested", the UE shall include the supported UE parameters update data set types list in the sent acknowledgement. The UE shall include all supported UE parameters update data set types excluding "routing indicator update data" and "default configured NSSAI update data" in the supported UE parameters update data set types list. If the UE supports odd amount of the UE parameters update data set types, the UE shall include one of the supported UE parameters update data set types in the supported UE parameters update data set types list twice;

B) the ME shall replace the stored default configured NSSAI with the default configured NSSAI included in the default configured NSSAI update data; and C) if the UE parameters update list does not include a UE parameters update data set with UE parameters update data set type indicating "Routing indicator update data", the UE used the old default configured NSSAI to create the requested NSSAI in a REGISTRATION REQUEST message, the UE does not have a configured NSSAI for the current PLMN and the UE has an allowed NSSAI for the current PLMN which contains one or more S-NSSAIs that are not included in the new default configured NSSAI, the UE shall wait until it enters 5GMM-IDLE mode and then the UE shall initiate a registration procedure for mobility and periodic registration update as specified in subclause 5.5.1.3; and 2) does not successfully pass the integrity check (see 3GPP TS 33.501 [24]) then the UE shall discard the content of the payload container IE;

j) "Location services message container" and the 5GMM cause IE is not included in the DL NAS TRANSPORT message, the UE shall forward the payload container type, the content of the Payload container IE and the routing information in the Additional information IE if included to the upper layer location services application;

k) "CIoT user data container", the UE shall forward the content of the Payload container IE and the PDU session ID to the 5GSM sublayer; and l) "CIoT user data container" and:

1) the 5GMM cause IE is set to the 5GMM cause #22 "Congestion", the UE passes to the 5GSM sublayer an indication that the CIoT user data was not forwarded due to DNN based congestion control along with the CIoT user data from the Payload container IE of the DL NAS TRANSPORT message, and the time value from the Back-off timer value IE.

2) the 5GMM cause IE is set to the 5GMM cause #90 "payload was not forwarded", the UE passes to the 5GSM sublayer an indication that the user data container was not forwarded due to routing failure along with the user data container from the Payload container IE and the PDU session ID from the PDU session ID IE of the DL NAS TRANSPORT message.

m) "Multiple payloads", the UE shall first decode the content of the Payload container IE (see subclause 9.11.3.39) to obtain the number of payload container entries and for each payload container entry, the UE shall:

1) decode the payload container type field;

2) decode the optional IE fields and the payload container contents field in the payload container entry; and 3) handle the content of each payload container entry the same as the content of the Payload container IE and the associated optional IEs as specified in bullets a) to l) above according to the payload container type field.

*** change ***

9.11.3.53A    UE parameters update transparent container

The purpose of the UE parameters update transparent container when sent from the network to the UE is to provide UE parameters update data, optional acknowledgement request, ~~and~~ optional re-registration request and optional supported UE parameters update data set types request. The purpose of the UE parameters update transparent container when sent from the UE to the network is to indicate the UE acknowledgement of successful reception of the UE parameters update transparent container and optional supported UE parameters update data set types list.

The UE parameters update transparent container information element is coded as shown in figure 9.11.3.53A.1, figure 9.11.3.53A.2, figure 9.11.3.53A.3, figure 9.11.3.53A.4, figure 9.11.3.53A.5, figure 9.11.3.53A.6, figure 9.11.3.53A.7, figure 9.11.3.53A.8 and table 9.11.3.53A.1.

The UE parameters update transparent container is a type 6 information element with a minimum length of 20 octets.

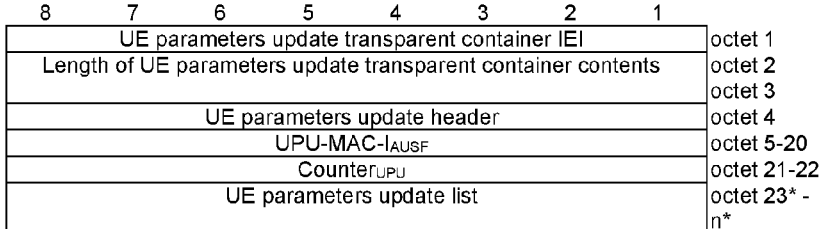

Figure 9.11.3.53A.1: UE parameters update transparent container information element for UE parameters update data type with value "0"

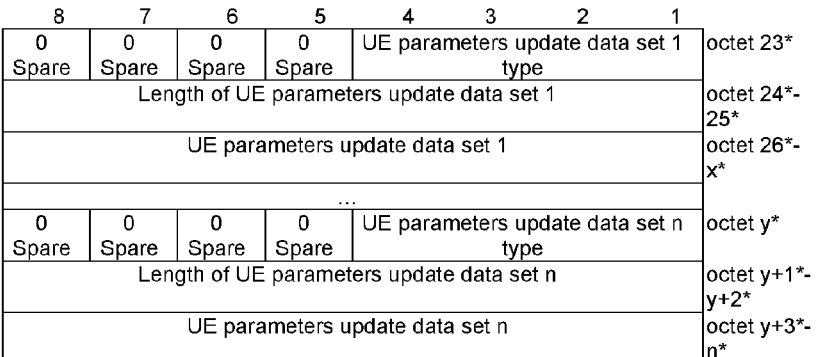

Figure 9.11.3.53A.2: UE parameters update list

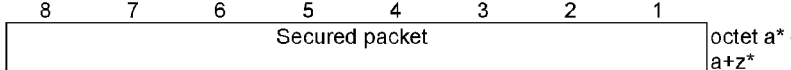

Figure 9.11.3.53A.3: UE parameters update data set for UE parameters update data set type with value "00000001"

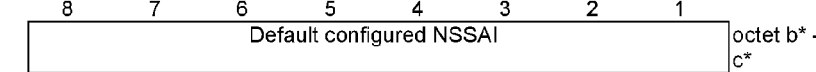

Figure 9.11.3.53A.4: UE parameters update data set for UE parameters update data set type with value "00000010"

US 12,574,721 B2

33                                                                34

| UE parameters update transparent container IEI | octet 1 |
| Length of UE parameters update transparent container contents | octet 2 |
| | octet 3 |
| UE parameters update header | octet 4 |
| UPU-MAC-I_UE | octet 5 - 20 |
| | octet 21* |
| Supported UE parameters update data set types list | |
| | octet u* |

Figure 9.11.3.53A.5: UE parameters update transparent container information element for UE parameters update data type with value "1"

| 8 | 7 | 6 | 5 | 4 | 3 | 2 | 1 | |
|---|---|---|---|---|---|---|---|---|
| 0 Spare | 0 Spare | 0 Spare | 0 Spare | ~~0 Spare~~ SDSTR | REG | ACK | UPU data type | octet 4 |

Figure 9.11.3.53A.6: UE parameters update header for UE parameters update data type with value "0"

| 8 | 7 | 6 | 5 | 4 | 3 | 2 | 1 | |
|---|---|---|---|---|---|---|---|---|
| 0 Spare | 0 Spare | 0 Spare | 0 Spare | 0 Spare | 0 Spare | ~~0 Spare~~ SDSTLI | UPU data type | octet 4 |

Figure 9.11.3.53A.7: UE parameters update header for UE parameters update data type with value "1"

| Length of supported UE parameters update data set types list contents | | octet 21 |
|---|---|---|
| UE parameters update data set type 2 | UE parameters update data set type 1 | octet 22* |
| UE parameters update data set type 4 | UE parameters update data set type 3 | octet 23* |
| ... | | |
| UE parameters update data set type n | UE parameters update data set type (n-1) | octet u* |

Figure 9.11.3.53A.8: Supported UE parameters update data set types list

Table 9.11.3.53A.1: UE parameters update transparent container information element

| |
|---|
| UPU-MAC-I$_{AUSF}$, UPU-MAC-I$_{UE}$ and Counter$_{UPU}$ are coded as specified in 3GPP TS 33.501 [24]<br><br>UPU data type (octet 4, bit 1)<br>0  The UE parameters update transparent container carries a UE parameters update list<br>1  The UE parameters update transparent container carries an acknowledgement of successful reception of a UE parameters update list<br><br>Acknowledgement (ACK) value (octet 4, bit 2)<br>0  acknowledgement not requested<br>1  acknowledgement requested<br><br>Re-registration (REG) value (octet 4, bit 3)<br>0  re-registrationt not requested<br>1  re-registration requested<br><br><u>Supported UE parameters update data set types request (SDSTR) value (octet 4, bit 4)</u><br><u>0  Supported UE parameters update data set types not requested</u><br><u>1  Supported UE parameters update data set types requested</u><br><br><u>Supported UE parameters update data set types list indicator (SDSTLI) value (octet 4, bit 2)</u><br><u>0  Supported UE parameters update data set types list absent</u><br><u>1  Supported UE parameters update data set types list present</u><br><br>UE parameters update data set type<br>Bits<br>4 3 2 1<br>0 0 0 1 Routing indicator update data<br>0 0 1 0 Default configured NSSAI update data<br><br>All other values are reserved<br><br>The secured packet is coded as specified in 3GPP TS 31.115 [22B].<br><br>The default configured NSSAI is encoded as the value part of the NSSAI IE (see subclause 9.11.3.37). |

SOME EMBODIMENTS

Some embodiments described herein can be summarized in the following enumerated manner:

1. A method performed by a network node (524) for handling User Equipment, UE, Parameters Update, UPU, data set types which may not be supported by a UE (520), the method comprising one or more of:

receiving (506, 606, 726a, 826a) an indication of UPU data set types supported by a UE (520);

determining (507, 607) if a given UPU data set type is supported by the UE based on the indication;

if the given UPU data set type is supported by the UE, sending (508, 608) a UPU message towards the UE with the given UPU data set type; and if the given UPU data set type is not supported by the UE, not sending the UPU message to the UE with the given UPU data set type.

2. The method of embodiment 1, further comprising requesting (500, 600) UPU data set types supported by the UE and receiving (506, 606) the indication of UPU data set types supported by the UE in response.

3. The method of embodiment 2, wherein requesting the UPU data set types supported by the UE comprises sending (500, 600) a message to another network node (522).

4. The method of embodiment 3, wherein sending the message to the other network node comprises sending (500) a Nudm_SDM_Notification comprising an indication for supported UPU data set types requested to an Application and Mobility Management Function, AMF.

5. The method of embodiment 4, wherein the indication of UPU data set types supported by the UE is received from the AMF and comprises supported UPU data set types.

6. The method of any of embodiments 4 to 5, wherein if the given UPU data set type is supported by the UE, sending the UPU message comprises sending (508) a Nudm_SDM_Notification comprising the UPU with the given UPU data set type.

7. The method of any of embodiments 4 to 6, wherein the AMF sends (502) the indication for supported UPU data set types requested to the UE in a Downlink, DL, Non-Access Stratum, NAS, transport message.

8. The method of embodiment 7, wherein the AMF:

receives (504) the indication of the UPU data set types supported from the UE in an Uplink, UL, NAS transport message; and sends (506) the indication of the UPU data set types supported to the network node in a Nudm_SDM_Info message.

9. The method of embodiment 3, wherein sending the message to the other network node comprises sending (600) a Nudm_SDM_Notification comprising an indication for supported UPUData type attributes requested to an Application and Mobility Management Function, AMF.

10. The method of embodiment 9, wherein the indication of UPU data set types supported by the UE is received from the AMF and comprises supported UPUData type attributes.

11. The method of any of embodiments 9 to 10, wherein if the given UPU data set type is supported by the UE, sending the UPU message comprises sending a Nudm_SDM_Notification comprising the UPU with a UPUData type attribute corresponding to the given UPU data set type.

12. The method of any of embodiments 9 to 11, wherein the AMF sends (602) an indication for supported UPU data set types requested corresponding to the supported UPUData type attributes requested to the UE in a Downlink, DL, Non-Access Stratum, NAS, transport message.

13. The method of embodiment 12, wherein the AMF:

receives (604) the indication of UPU data set types supported from the UE in an Uplink, UL, NAS transport message; and sends (606) an indication for supported UPUData type attributes corresponding to the supported UPU data set types to the network node in a Nudm_SDM_Info message.

14. The method of any of embodiments 2 to 13, further comprising storing the UPU data set types supported by the UE associated with a Permanent Equipment Identifier, PEI, of the UE.

15. The method of embodiment 14, further comprising using the stored UPU data set types supported by the UE in a subsequent UPU procedure associated with the PEI.

16. The method of embodiment 1, wherein receiving the indication of UPU data set types supported by the UE comprises receiving (726a, 826a) the indication of UPU data set types supported by the UE during an initial registration procedure.

17. The method of embodiment 16, wherein the indication of UPU data set types supported by the UE is received from an Access and Mobility Management Function, AMF.

18. The method of embodiment 17, wherein the AMF receives the indication of UPU data set types supported by the UE in a Registration Request from the UE.

19. The method of any of embodiments 17 to 18, wherein receiving the indication of UPU data set types supported by the UE comprises receiving (726a) a Nudm_UECM_Registration message from the AMF comprising the indication of UPU data set types supported by the UE.

20. The method of any of embodiments 17 to 18, wherein receiving the indication of UPU data set types supported by the UE comprises receiving (826a) a Nudm_UECM_Registration message from the AMF comprising an indication for supported UPUData type attributes corresponding to the indication of UPU data set types supported by the UE.

21. The method of any of embodiments 16 to 20, further comprising storing the UPU data set types supported by the UE associated with a Permanent Equipment Identifier, PEI, of the UE during the initial registration procedure.

22. The method of embodiment 21, further comprising using the stored UPU data set types supported by the UE in a subsequent UPU procedure associated with the PEI.

23. A network node for handling User Equipment, UE, Parameters Update, UPU, data set types which may not be supported by a UE, the network node comprising:

processing circuitry configured to perform any of the steps of any of embodiments 1 to 22; and power supply circuitry configured to supply power to the network node.

24. The network node of embodiment 23, wherein the network node comprises a Unified Data Management, UDM, function.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
5GSM Fifth Generation System Session Management AF Application Function
AMF Access and Mobility Management Function
AN Access Network
AUSF Authentication Server Function
CP Control Plane
DL Downlink
DN Data Network
DSP Digital Signal Processor
eNB Enhanced or Evolved Node B
gNB New Radio Base Station
HPLMN Home Public Land Mobile Network
HSS Home Subscriber Server
IE Information Element
IoT Internet of Things
IP Internet Protocol
LCS Location Services
LTE Long Term Evolution
MME Mobility Management Entity
MTC Machine Type Communication
NAS Non-Access Stratum
NEF Network Exposure Function
NF Network Function
ng-eNBs Next Generation Enhanced or Evolved Node B
NG-RAN Next Generation Radio Access Network
NR New Radio
NRF Network Function Repository Function
NSSAI Network Slice Selection Assistance Information
NSSF Network Slice Selection Function
PCF Policy Control Function
PEI Permanent Equipment Identifier
P-GW Packet Data Network Gateway
QoS Quality of Service
RAN Radio Access Network
Rel-15 Release 15
Rel-17 Release 17
RTT Round Trip Time
SCEF Service Capability Exposure Function
SMF Session Management Function
SMS Short Message Service
TS Technical Specification
UDM Unified Data Management
UE User Equipment
UL Uplink
UP User Plane
UPF User Plane Function
UPU User Equipment Parameters Update
USIM Universal Subscriber Identity Module

What is claimed is:

1. A method performed by a network node for handling User Equipment, UE, Parameters Update, UPU, data set types which may not be supported by a UE, the method comprising:
requesting UPU data set types supported by the UE by sending a Nudm_SDM_Notification comprising a request for supported UPU data set types to an Application and Mobility Management Function (AMF);
receiving, in response to the request, an indication of UPU data set types supported by the UE;
determining if a given UPU data set type is supported by the UE based on the indication;
if the given UPU data set type is supported by the UE, sending a UPU message towards the UE with the given UPU data set type; and
if the given UPU data set type is not supported by the UE, not sending the UPU message to the UE with the given UPU data set type.

2. The method of claim 1, wherein the indication of UPU data set types supported by the UE is received from the AMF and comprises supported UPU data set types.

3. The method of claim 1, wherein the AMF sends the indication for supported UPU data set types requested to the UE in a Downlink, DL, Non-Access Stratum, NAS, transport message.

4. The method of claim 1, wherein sending the message to the other network node comprises sending a Nudm_SDM-_Notification comprising an indication for supported UPU-Data type attributes requested to an Application and Mobility Management Function, AMF.

5. The method of claim 4, wherein the indication of UPU data set types supported by the UE is received from the AMF and comprises supported UPUData type attributes.

6. The method of claim 4, wherein if the given UPU data set type is supported by the UE, sending the UPU message comprises sending a Nudm_SDM_Notification comprising the UPU with a UPUData type attribute corresponding to the given UPU data set type.

7. The method of claim 4, wherein the AMF sends an indication for supported UPU data set types requested corresponding to the supported UPUData type attributes requested to the UE in a Downlink, DL, Non-Access Stratum, NAS, transport message.

8. A network node for handling User Equipment, UE, Parameters Update, UPU, data set types which may not be supported by a UE, the network node comprising:
processing circuitry configured to:
request UPU data set types supported by the UE by sending a Nudm_SDM_Notification comprising a request for supported UPU data set types to an Application and Mobility Management Function (AMF);
receive, in response to the request, an indication of UPU data set types supported by the UE;
determine if a given UPU data set type is supported by the UE based on the indication;
if the given UPU data set type is supported by the UE, send a UPU message towards the UE with the given UPU data set type; and
if the given UPU data set type is not supported by the UE, not send the UPU message to the UE with the given UPU data set type; and
power supply circuitry configured to supply power to the network node.

9. The network node of claim 8, wherein the network node comprises a Unified Data Management, UDM, function.

* * * * *